(12) United States Patent
Kanao

(10) Patent No.: US 8,323,786 B2
(45) Date of Patent: Dec. 4, 2012

(54) LIGHTWEIGHT CEMENT PANEL

(75) Inventor: Shigeki Kanao, Nishinomiya (JP)

(73) Assignee: Kanaflex Corporation Inc., Osaka-shi (JP)

( * ) Notice: Subject to any disclaimer, the term of this patent is extended or adjusted under 35 U.S.C. 154(b) by 1219 days.

(21) Appl. No.: 11/976,243

(22) Filed: Oct. 23, 2007

(65) Prior Publication Data

US 2008/0118735 A1    May 22, 2008

(30) Foreign Application Priority Data

| Oct. 26, 2006 | (JP) | ................................ 2006-291867 |
| Dec. 4, 2006 | (JP) | ................................ 2006-327661 |
| Jul. 17, 2007 | (JP) | ................................ 2007-185241 |
| Aug. 31, 2007 | (JP) | ................................ 2007-226121 |
| Aug. 31, 2007 | (JP) | ................................ 2007-226140 |

(51) Int. Cl.
  *B32B 13/02* (2006.01)
  *B32B 27/00* (2006.01)
  *B32B 3/18* (2006.01)

(52) U.S. Cl. ...................... 428/294.7; 428/300.7; 156/42

(58) Field of Classification Search ........................ None
See application file for complete search history.

(56) References Cited

U.S. PATENT DOCUMENTS

| 4,816,091 A | 3/1989 | Miller .............................. 156/42 |
| 2002/0182953 A1 | 12/2002 | Porter ............................... 442/4 |
| 2002/0182954 A1 | 12/2002 | Porter ............................... 442/57 |
| 2004/0200168 A1 | 10/2004 | Takagi et al. ................... 52/415 |

FOREIGN PATENT DOCUMENTS

| CN | 1115307 | 1/1996 |
| CN | 2262066 Y | 9/1997 |
| CN | 1416390 | 5/2003 |
| JP | 55-095728 | 7/1980 |
| JP | 56-30580 | 7/1981 |
| JP | 61-28511 | 6/1986 |
| JP | 62-166915 | 10/1987 |
| JP | 02-063823 | 3/1990 |
| JP | 03-295838 | 12/1991 |
| JP | 518042 | 1/1993 |

(Continued)

OTHER PUBLICATIONS

Chinese Office Action dated Aug. 4, 2010. (in Chinese). English Translation of the Chinese Office Action dated Aug. 4, 2010.
English translation of communication received from the Chinese State Intellectual Property Office dated Mar. 30, 2011 (6 pages).
Communication received from the Chinese State Intellectual Property Office dated Mar. 30, 2011 (5 pages).
Notification of Reasons for Refusal mailed Jun. 28, 2011 from the Japanese Paetnt Office with English translation (8 pages).
Notification of Reasons for Refusal mailed Aug. 29, 2011 from the Japanese Patent Office with English translation (8 pages).
Notice of Reasons of Refusal issued in counterpart application No. JP2007-275428 mailed Oct. 4, 2011 with English translation (8 pages).

(Continued)

*Primary Examiner* — Camie Thompson
(74) *Attorney, Agent, or Firm* — Kratz, Quintos & Hanson, LLP

(57) ABSTRACT

The invention provides a lightweight cement panel which achieves light weight, high strength, and durability, is free of degraded strength or deformation due to water absorption or fluctuation of ambient temperature, etc., provides satisfactory processing capabilities including nailing, etc. and can be used as a concrete formwork panel, floor material, wall material, ceiling material, and others of architectural structures.
A panel proper 2 is formed by a porous compact 8 produced by filling, curing, and solidifying a mixture prepared by kneading cement, water, reinforcing fibers, and foam obtained by prefoaming a foaming agent in a hermetically sealed cement form block block, contains the reinforcing fibers 7 and foam in a dispersion state in the compact 8, and provides the specific gravity within the range between 0.5 and 1.0. The surface of this panel proper 2 is integrally covered with a surface reinforcing sheet 4 comprising woven cloth or unwoven cloth, and the surface is further integrally covered by a surface protection layer 5.

22 Claims, 8 Drawing Sheets

FOREIGN PATENT DOCUMENTS

| | | |
|---|---|---|
| JP | 5-139803 | 6/1993 |
| JP | 5-340090 | 12/1993 |
| JP | 6-66021 | 3/1994 |
| JP | 8-91911 | 4/1996 |
| JP | 8-207190 | 8/1996 |
| JP | 9-13486 | 1/1997 |
| JP | 9-76404 | 3/1997 |
| JP | 9-287239 | 11/1997 |
| JP | 10-205057 | 8/1998 |
| JP | 11-182029 | 7/1999 |
| JP | 11-181950 | 8/1999 |
| JP | 2001-252916 | 9/2001 |
| JP | 2001-355171 | 12/2001 |
| JP | 2003-161037 | 6/2003 |
| JP | 2004-36253 | 2/2004 |
| JP | 2005-81657 | 3/2005 |
| JP | 2006-112038 | 4/2006 |
| WO | WO01/49484 | 7/2001 |
| WO | WO03/046311 | 6/2003 |

OTHER PUBLICATIONS

Abstract of JP 2003252668, Sep. 10, 2003.

Abstract of JP 2005139412, Jun. 2, 2005.

Abstract of JP 2006124231, May 18, 2006.

Decision of Refusal from the Japanese Patent Office issued on counterpart application No. JP2007-285715 mailed Jan. 17, 2012 with English translation (2 pages).

Decision of Refusal from the Japanese Patent Office issued on counterpart application No. JP2007-275428 mailed Jan. 24, 2012 with English translation (11 pages).

[Fig.1]
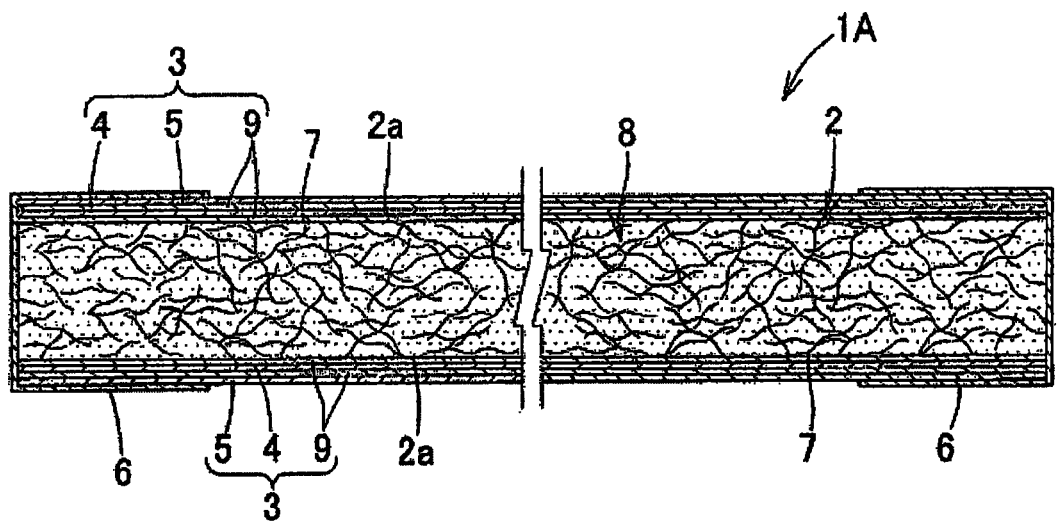
[Fig.2]
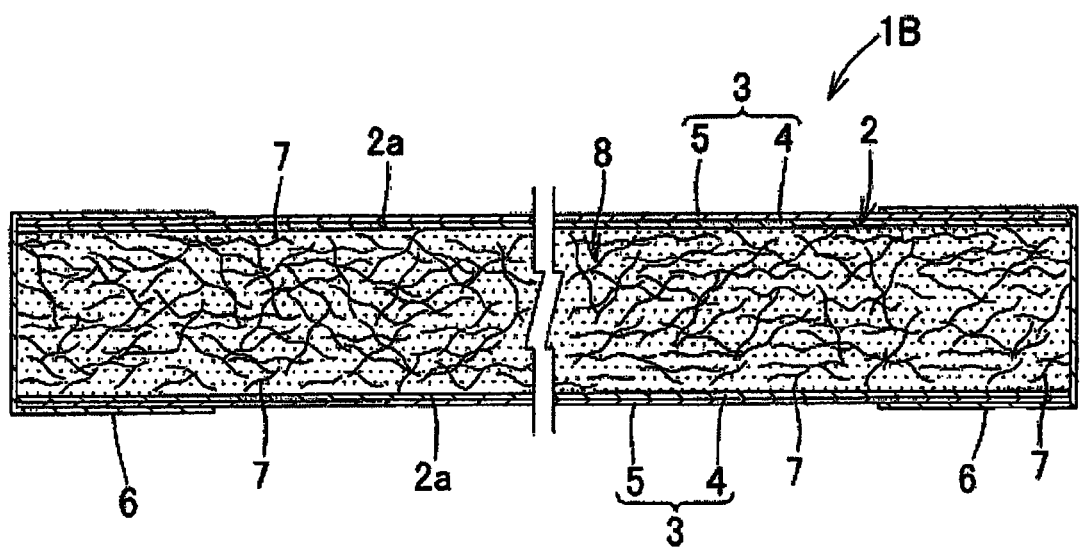

[Fig.3]
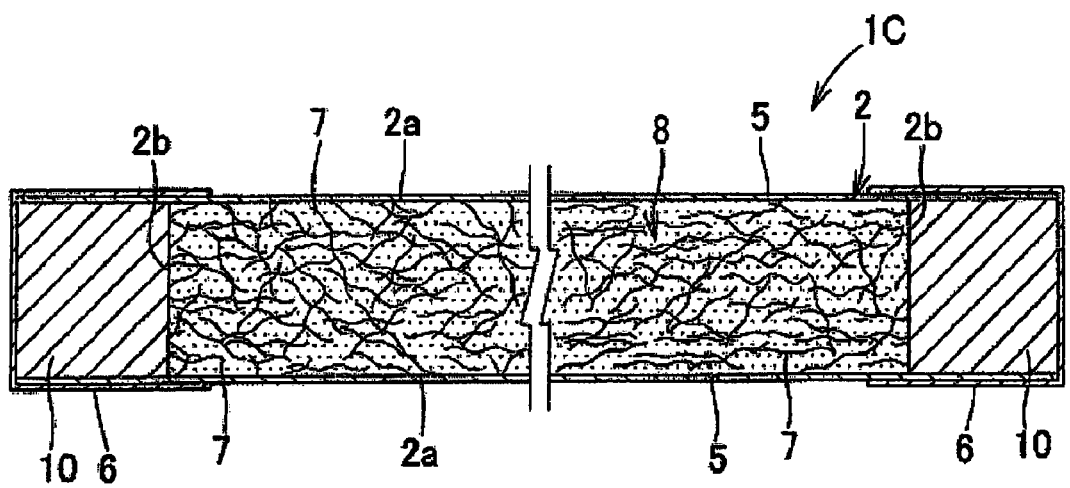
[Fig.4]
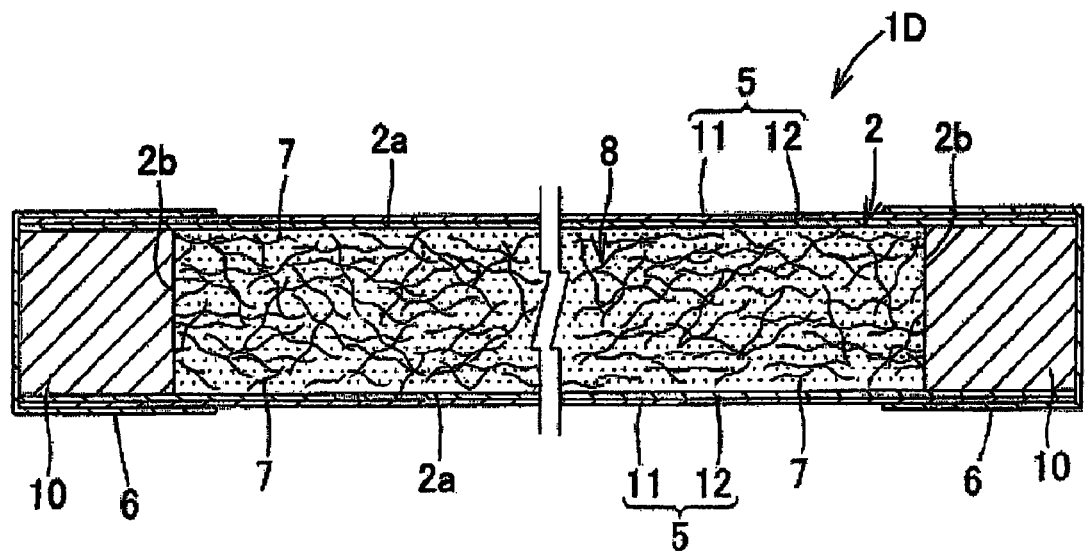

[Fig.5]
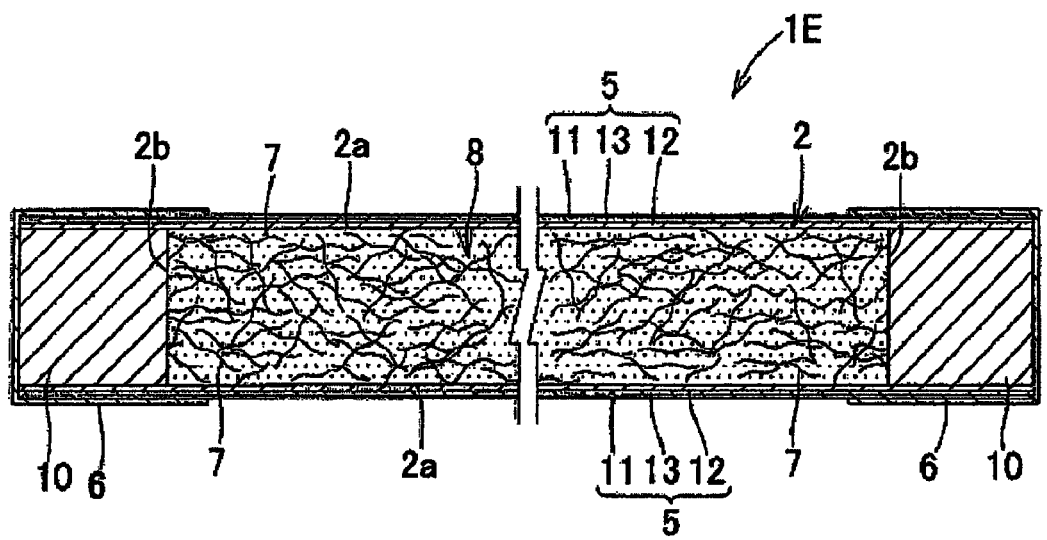
[Fig.6]
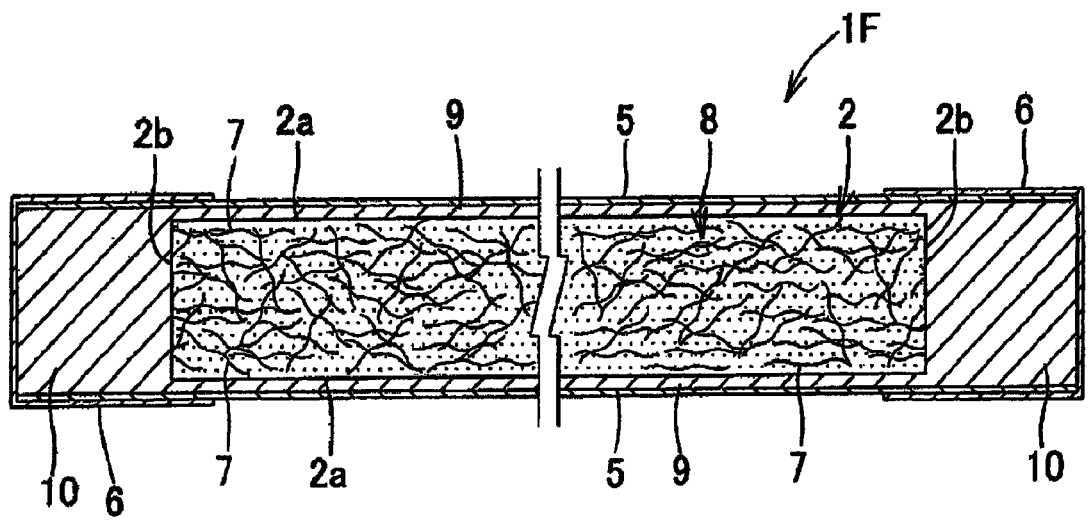

[Fig. 7]
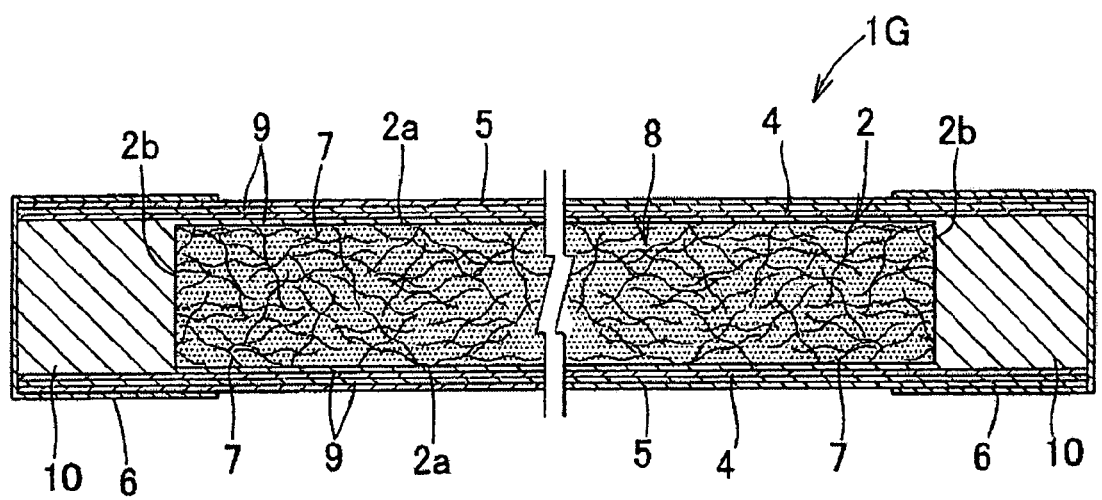
[Fig. 8]
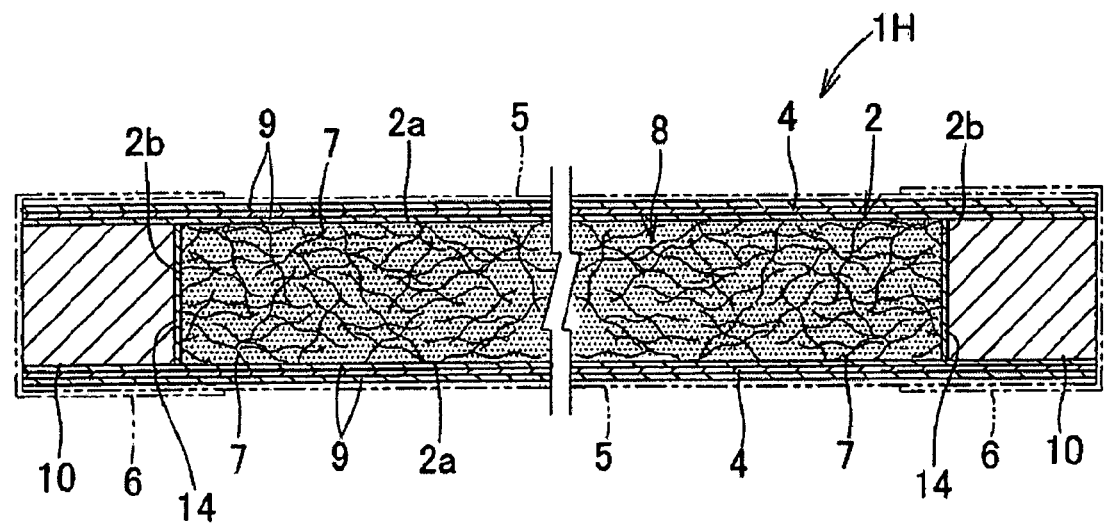

[Fig.9]
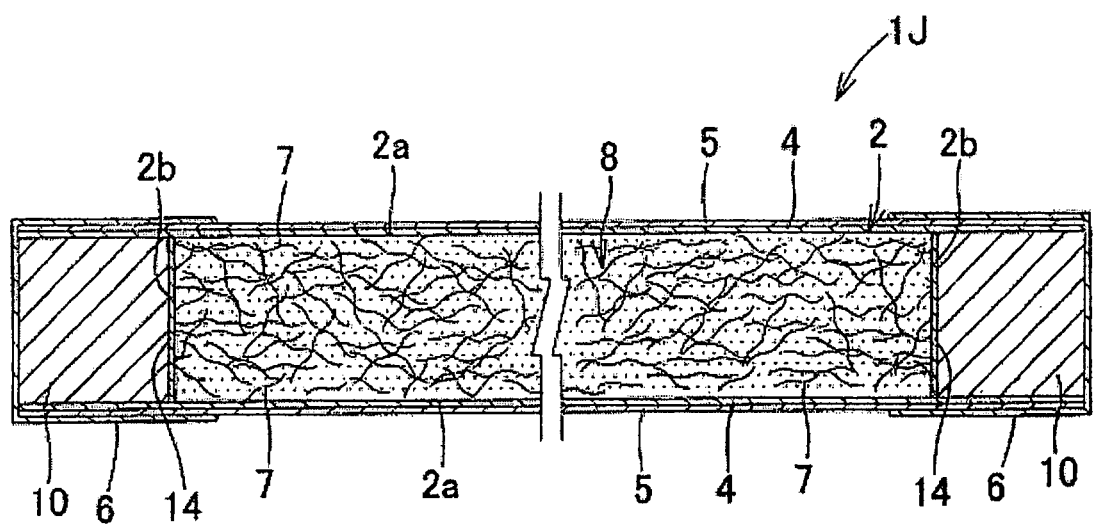
[Fig.10]
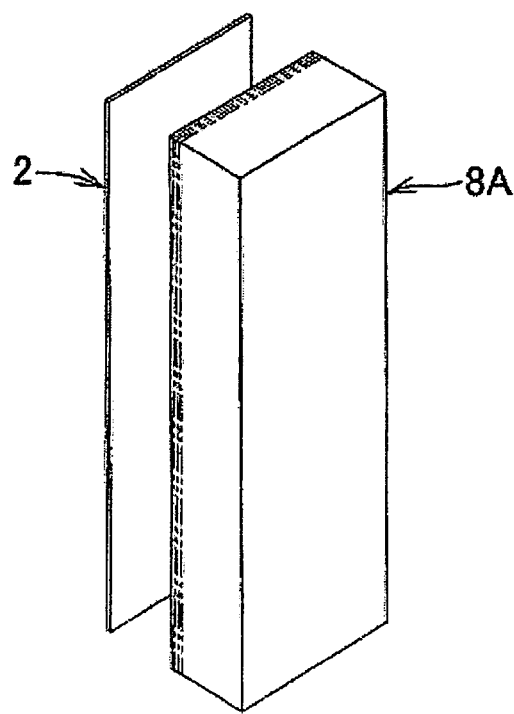

[Fig.11]
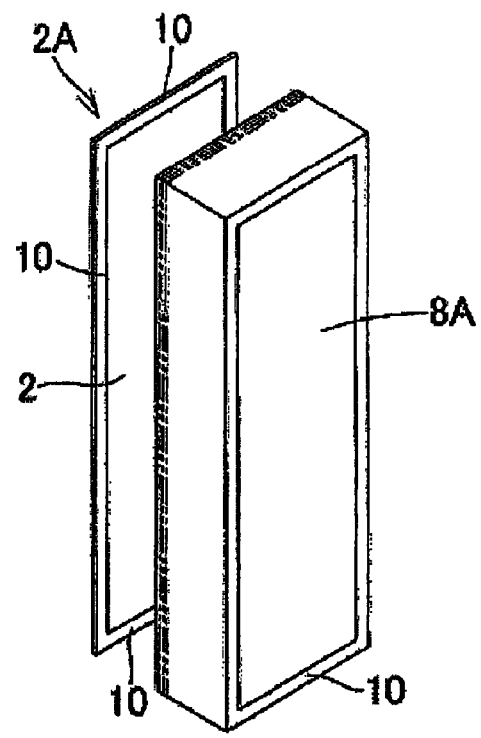
[Fig.12]
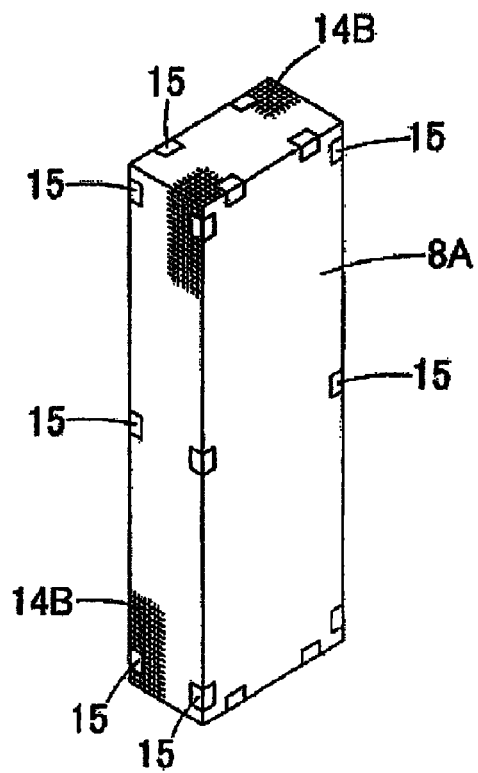

[Fig.13]
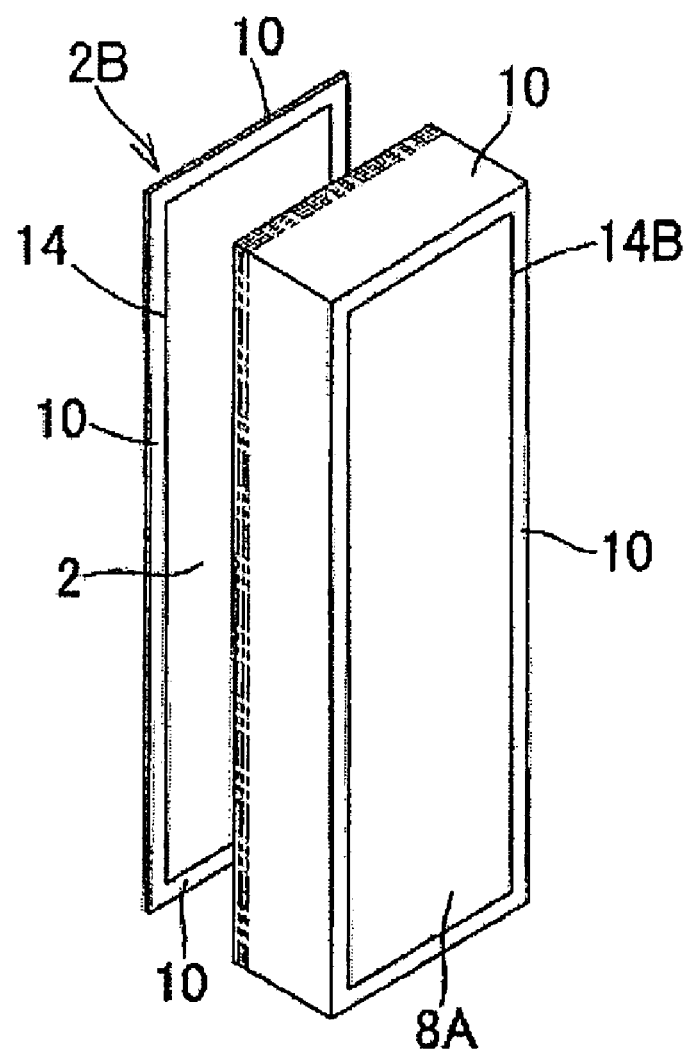

[Fig.14]
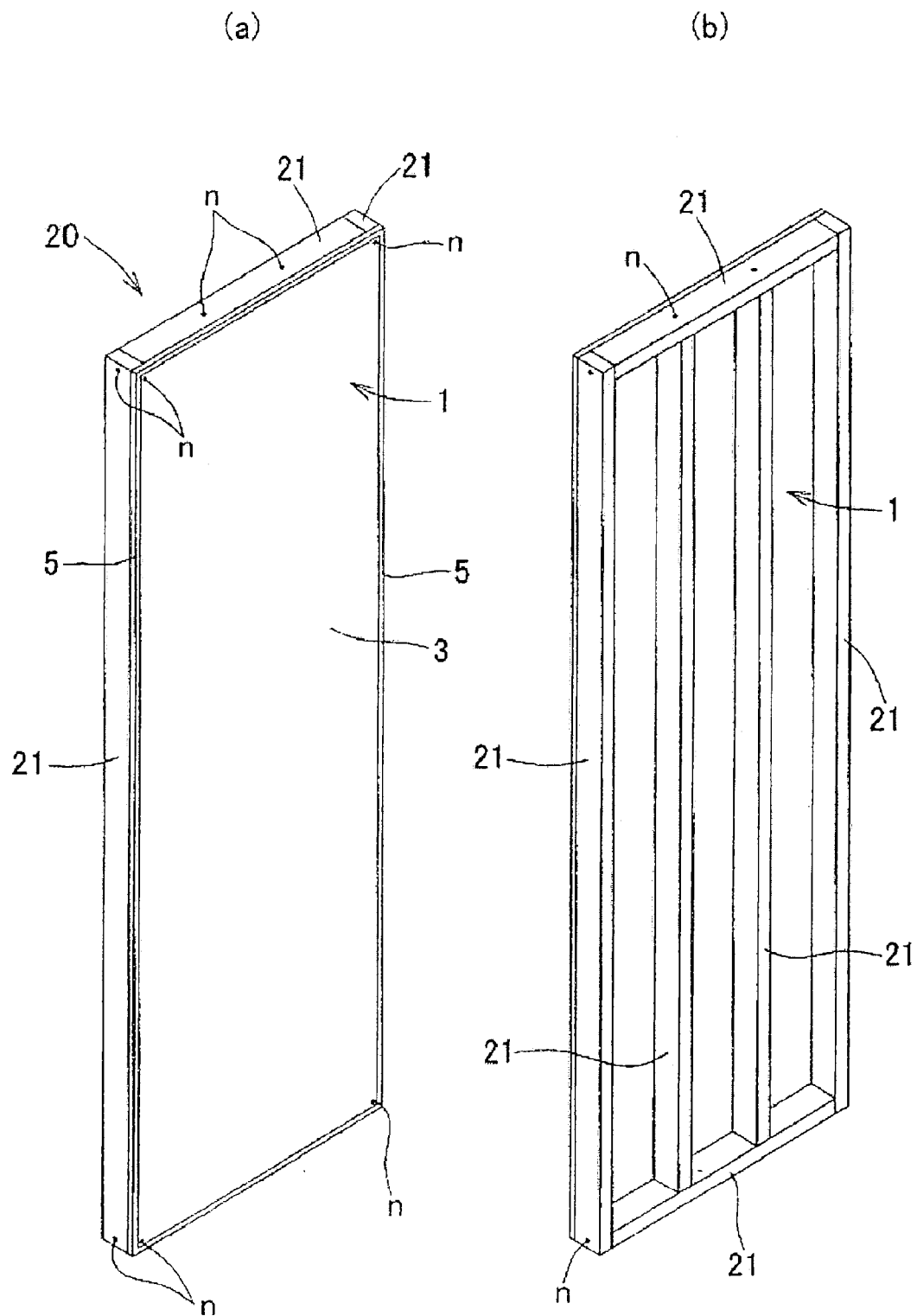

LIGHTWEIGHT CEMENT PANEL

BACKGROUND OF THE INVENTION

1. Field of the Invention

The present invention relates to a lightweight cement panel, and more specifically to a lightweight cement panel which can be extensively used in the construction field, civil engineering field, etc., for example, as a panel for concrete formwork, or wall material, floor material, ceiling material, etc. of buildings, and furthermore, heat insulation material, etc. incorporated in partitions which divide a room.

2. Description of the Background Art

Conventionally, as concrete formwork panels, wood-based plywood (hereinafter simply called "plywood") has been popularly used. However, plywood provides low durability and low water resistance, and has problems of absorbing water and increasing weight due to excess water at the time of casting concrete or rainfall at the time of storage, and at the same time, has a problem of degraded strength, and the number of repetitive use is about 3 to 7 times, which is small. Consequently, a large quantity of used plywood becomes construction waste, and it not only takes time and causes trouble to dispose of them by incineration, etc., but also results in degradation of global environment because a large quantity of lumber resources obtained from tropical forest are consumed by using plywoods. Therefore, it is requested to reduce the use of plywood. Furthermore, plywood is fabricated by laminating about six sheets of single panel and bonding them by polyvinyl acetate-based adhesives. Consequently, when plywood is disposed of by incineration, hazardous gas is generated from vinyl acetate of adhesives and causes environmental pollution. In addition, when plywood with vinyl acetate-based adhesives is applied for building residences, etc., sick-house problems occur, and plywood is unable to be used, in particular, for clean rooms, etc.

In concrete formwork panels, in view of the problems of plywood, various synthetic resin-made formwork panels are proposed (for example, see Patent Document 1 to 4). These synthetic resin-made panels do not consume lumber resources and are able to be repeatedly used 20 times to 30 times and furthermore have no problem of increased weight caused by water absorption or lowered strength. However, synthetic resin-made panels provide large variation in strength due to changes of ambient temperature, in particular, large variation in flexural rigidity as compared to plywood. Consequently, when concrete is cast in the summertime, the flexural rigidity of panel is degraded and the panel may be deformed due to cast concrete pressure. Furthermore, the synthetic resin-made panel may have a limited nailable range, depending on the construction, and it is difficult to say that the synthetic resin-made panel provides satisfactory processing capabilities as is the case with plywood.

In addition, as panels used for concrete casting, those made of cement-based, concrete-based, and other inorganic material are known. For example, permanent forms including cement-based composite material with glass fiber, unwoven cloth, etc. composed with glass fiber, etc. used for reinforcing material (see Patent Document 5), permanent forms including reinforced glass fiber mixed concrete plate (GRC) (see Patent Document 6), concrete structure using permanent form made with fiber-reinforced cement such as glass fiber, etc. (see Patent Document 7), cast-in form made with composite material fabricated by sandwiching and bonding glass fiber and other inorganic fiber mesh, stainless steel, iron, and other steel mesh, etc. between cement-based hardening material and (foamed) concrete-based hardening material (see Patent Document 8), permanent form for concrete casting fabricated by lightweight concrete board with cement paste covered in which on both surfaces of ready-mixed concrete board proper with lightweight aggregate and foaming agent mixed, netlike reinforced fiber sheet embedded and integrated (see Patent Document 9), etc. are known. However, these conventional panels for concrete casting including inorganic material are all permanent forms, which blend with cast concrete structure and compose part of the structure after concrete is cast, and are not repeatedly used as is the case with concrete formwork panels made with plywood.

In addition, many panels made with inorganic material using concrete or cement reinforcing fibers such as polyvinyl alcohol fibers (Vinylon), etc. are proposed. For example, a formwork panel for concrete pouring formed by a constituent containing gypsum and silica, glass fiber, water-reducing admixture and polyvinyl alcohol for alumina cement (see Patent Document 10), composite panel material having a fine base substrate layer composed with extruded hydraulic hardening material of hydraulic mixture including hydraulic inorganic material and reinforcing fiber material such as polyvinyl alcohol based fiber, polyolefin based fiber, polyamide based fiber, linen, glass fiber, carbon fiber, pulp fiber, and a porous packed bed laminated and coalescenced on one surface of the fine base substrate layer and having 0.6 or less specific gravity (see Patent Document 11), fiber-reinforced cement compact containing reinforcing fiber in which synthetic fiber A and polyvinyl alcohol based synthetic fiber B are mixed in such a manner that the weight ratio A/B of A and B achieves 0.1 to 3 (see Patent Document 12), fiber-reinforced board material based on hydraulic substance using meshed organization composed with spun yarn, such as polyvinyl alcohol based synthetic fiber as reinforcing material (see Patent Document 13), formwork that uses hydraulic paste containing at least hydraulic material, reinforcing fiber, and water and formwork at least part of the reinforcing fiber of which is polyvinyl alcohol based fiber (see Patent Document 14), hardboard containing fiber entwined material including polyvinyl alcohol based main-body fiber, in which the main-body fibers are bonded by polyvinyl alcohol based binder (see Patent Document 15), concrete structure having a structure main body formed by reinforcement rebar embedded and hardened concrete and fiber-reinforced high toughness cement board with cement which is integrated as permanent formwork onto the outer surface the structure main body used as active ingredients and high-strength Vinylon fiber used as reinforcing fiber (see Patent Document 16), precast concrete compact obtained by forming hydraulic constituent containing reinforcing fiber including polyvinyl alcohol based fiber and/or polyolefin-based fiber by centrifugal forming step (see Patent Document 17), fiber-reinforced exterior heat insulation material fabricated by laminating glass mesh or carbon mesh and urethane foam on one surface of high-strength high-toughness fiber-reinforced cement board formed by laminating glass mesh or carbon mesh and urethane foam on one surface of paper-made sheet in which reinforcing fiber contains polyvinyl alcohol based synthetic fiber (see Patent Document 18), etc. are proposed.

However, conventionally, there was no panel which provides durability that enables repetitive use equal to or higher than that of plywood and at the same time, provides processing capability, light weight, workability, handleability, etc. similar to those of plywood.

[Patent Document 1: Japanese Unexamined Patent Publication No. 6-66021
[Patent Document 2: Japanese Unexamined Patent Publication No. 8-207190

[Patent Document 3: Japanese Unexamined Patent Publication No. 11-182029
[Patent Document 4: Japanese Unexamined Patent Publication No. 2003-161037
[Patent Document 5: Japanese Unexamined Patent Publication No. 55-95728
[Patent Document 6: Japanese Examined Patent Publication No. 61-28511
[Patent Document 7: Japanese Unexamined Patent Publication No. 9-13486
[Patent Document 8: Japanese Unexamined Patent Publication No. 9-76404
[Patent Document 9: Japanese Unexamined Patent Publication No. 9-287239
[Patent Document 10: Japanese Unexamined Patent Publication No. 5-340090
[Patent Document 11: Japanese Unexamined Patent Publication No. 5-18042
[Patent Document 12: Japanese Unexamined Patent Publication No. 5-139803
[Patent Document 13: Japanese Unexamined Patent Publication No. 8-91911
[Patent Document 14: Japanese Unexamined Patent Publication No. 2001-252916
[Patent Document 15: Japanese Unexamined Patent Publication No. 2001-355171
[Patent Document 16: Japanese Unexamined Patent Publication No. 2004-36253
[Patent Document 17: Japanese Unexamined Patent Publication No. 2005-81657
[Patent Document 18: Japanese Unexamined Patent Publication No. 2006-112038

SUMMARY OF THE INVENTION

In view of the above-mentioned problems in conventional concrete formwork panels, it is an object of the present invention to provide a panel which is composed with inorganic material, is free of degraded strength, deformation, or increased weight due to water absorption, fluctuation of ambient temperature, etc., and achieves satisfactory processing capabilities including nailing, etc. and at the same time light weight, superb handleability, high strength, and durability, and which can be used repeatedly as a concrete formwork panel, and which can be used as construction material for architectural structures, such as floor material, wall material, ceiling material, partitions, and others, and which can be substituted for plywood.

In order to achieve the above object, the lightweight cement panel according to the present invention is characterized in that a surface reinforcing sheet made with woven cloth or unwoven cloth integrally covers the surface of the panel proper including lightweight cement, and provides the specific gravity within the range between 0.5 and 1.0. As a preferable embodiment, the panel proper is formed by a porous compact prepared by filling, curing, and solidifying a mixture prepared by kneading cement, water, reinforcing fibers, and foam obtained by prefoaming a foaming agent in a cement form block, and contains the reinforcing fibers and foam in a dispersion state in the compact, and provides the specific gravity within the range between 0.5 and 1.0.

In the lightweight cement panel according to the present invention, it is desirable to compound 1 to 5 parts by weight of the reinforcing fibers with respect to 100 parts by weight of cement in the kneaded mixture. For the reinforcing fibers, Vinylon is preferable. It is preferable that the fiber length of the reinforcing fibers is between 4 and 35 mm.

The surface protection layer may be bonded to the surface of the panel proper by adhesives but in the event that the surface of the panel proper is integrally covered with a surface resin layer including synthetic resin, the surface reinforcing sheet is installed to be embedded in the surface resin layer, the surface reinforcing sheet may be bonded to the panel proper by synthetic resin which composes the surface resin layer.

It is preferable that the side end face of the panel proper is integrally covered with the side foam layer including expandable synthetic resin and the side foam layer surface is integrally covered by the surface reinforcing sheet together with the panel proper.

It is possible to install the side reinforcing sheet including woven cloth or unwoven cloth to be embedded between the side end face and side foam layer of the panel proper and to increase strength and rigidity against twisting of the panel proper.

In the event that this kind of surface reinforcing sheet or side reinforcing sheet is installed, it is preferable to use glass fibers made unwoven cloth having a weight per square meter set to 50-1000 g/m$^2$ in order to suppress an increase of fabrication cost as well as to prevent delamination.

It is preferable to integrally cover the surface of the surface reinforcing sheet with the surface protection layer.

The surface protection layer may be configured by film, sheet, or board made of non-expandable synthetic resin. In addition, it is a preferable embodiment to integrally cover the outer-circumferential end part of the surface reinforcing sheet or the surface protection layer with an end part protection layer in order to prevent the surface reinforcing sheet or the surface protection layer from exfoliating from the outer-circumferential end part.

The cement panel of the present invention can be extensively used for construction or civil engineering, and in particular, it can be repeatedly used as a concrete formwork panel in place of plywood which has been conventionally used in the same manner as plywood.

In particular, it is a preferable embodiment of the lightweight cement panel according to the present invention which includes a panel proper formed by a porous compact produced by filling, curing, and solidifying a mixture prepared by kneading cement, water, reinforcing fibers, and foam obtained by prefoaming a foaming agent in a hermetically sealed cement form block, and containing the reinforcing fibers and foam in a dispersion state in the compact, and providing the specific gravity within the range between 0.5 and 1.0, a side foam layer including expandable synthetic resin that integrally covers the side end face of the panel proper, a side face reinforcing sheet including woven cloth or unwoven cloth installed to be embedded between the side end face of the panel proper and the side foam layer, a surface resin layer including synthetic resin that integrally covers the surface of the panel proper, a surface reinforcing sheet including woven cloth or unwoven cloth that is disposed to be embedded in the surface resin layer.

The first method for manufacturing a lightweight cement panel according to the present invention comprises steps of disposing a panel proper including lightweight cement in a hermetically sealable product form block, filling a clearance between the inner surface of the product form block and the surface of the panel proper with expandable synthetic resin so that the surface reinforcing sheet including woven cloth or unwoven cloth is disposed to be embedded, and bonding the surface reinforcing sheet to the panel proper by the surface resin layer by closing the product form block under this condition and foaming and hardening the expandable synthetic resin.

In addition, the second method for manufacturing a lightweight cement panel according to the present invention comprises steps of disposing a panel proper including lightweight cement in a product form block with a film, sheet, or board which serves as a surface protection layer disposed on the inner surface of the hermetically-sealable product form block, filling a clearance between the inner surface of the surface protection layer and the surface of the panel proper with expandable synthetic resin so that the surface reinforcing sheet including woven cloth or unwoven cloth is disposed to be embedded, integrally covering the surface of the panel proper with the surface resin layer with the surface reinforcing sheet embedded by closing the product form block under this condition and foaming and hardening the expandable synthetic resin, and simultaneously bonding film, sheet, or board which serves as the surface protection layer to the panel proper by the surface resin layer.

In the first and the second methods for manufacturing a lightweight cement panel, it is also possible that a product form block with an inner space slightly larger than the panel proper is used, the circumference of the panel proper is also filled with expandable synthetic resin at the time of filling expandable synthetic resin, and the side end face of the panel proper is integrally covered with the side foam layer including expandable synthetic resin.

In addition, it is also possible that the side reinforcing sheet including woven cloth or unwoven cloth temporarily fixed to the side end face of the side reinforcing sheet is disposed in the product form block as the panel proper and the side reinforcing sheet may be installed to be embedded between the panel proper and the side foam layer.

In the first and the second methods of manufacturing a lightweight cement panel, for the manufacturing method of the panel proper composed with lightweight cement, either of the following two methods of manufacturing the panel proper may be adopted.

The first method for manufacturing a panel proper is to fill, cure and solidify the mixture prepared by kneading cement, water, reinforcing fibers, and foam obtained by prefoaming a foaming agent in a hermetically sealed cement form block to form one panel proper in one cement form block.

The second method for manufacturing a panel proper comprises a step for filling, curing, and solidifying a mixture prepared by kneading cement, water, reinforcing fibers, and foam obtained by prefoaming a foaming agent in a hermetically sealed cement form block and a step for manufacturing the panel proper by slicing the porous compact, and this is intended to fabricate a larger block-form porous compact than the panel proper in a cement formwork and to slice the compact into a predetermined thickness to fabricate a panel proper.

The third method for manufacturing a lightweight cement panel according to the present invention comprises steps of manufacturing a porous compact by filling, curing, and solidifying a mixture prepared by kneading cement, water, reinforcing fibers, and foam obtained by prefoaming a foaming agent in a hermetically sealed cement form block, filling expandable synthetic resin between the outer-circumferential side surface of the porous compact and a foam-molding form block to foam and harden in the hermetically sealed foam-molding form block, and integrally covering the outer-circumferential side surface of the porous compact by the expandable synthetic resin layer, slicing the porous compact covered by the expandable synthetic resin layer and fabricating a panel proper of a predetermined thickness with the side end face covered by the side foam layer including the expandable synthetic resin, and integrally covering the surface of the panel proper with the surface reinforcing sheet.

The fourth method for manufacturing a lightweight cement panel according to the present invention comprises steps of manufacturing a porous compact by filling, curing, and solidifying a mixture prepared by kneading cement, water, reinforcing fibers, and foam obtained by prefoaming a foaming agent in a hermetically sealed cement form block, temporarily fixing a reinforcing sheet including woven cloth or unwoven cloth to the outer-circumferential side of the porous compact, filling a clearance between the outer-circumferential side surface of the porous compact to which the reinforcing sheet is temporarily fixed and the foam-molding form blocking with expandable synthetic resin in the hermetically sealed foam-molding form block to allow it to foam and solidify, integrally covering the reinforcing sheet and expandable synthetic resin layer on the outer circumferential side surface of the porous compact, fabricating the panel proper of a predetermined thickness with the side end face covered with a side face reinforcing sheet including the reinforcing sheet and the side part foam layer including the expandable synthetic resin by slicing the porous compact with the reinforcing sheet and expandable synthetic resin layer, and integrally covering the surface of the panel proper by the surface reinforcing sheet.

In the third and the fourth manufacturing methods, in the step of integrally covering the surface of the panel proper with the surface reinforcing sheet, the surface of the surface reinforcing sheet is able to be integrally covered by the surface protection layer.

In addition, in the step of covering the panel proper with the surface protection layer, with film, sheet or board which serves as the surface protection layer disposed on the inner surface of the sealable product form block, the panel proper including the lightweight cement is disposed in the product form block and at the same time, expandable synthetic resin is filled between the inner surface of the surface protection layer and the surface of the panel proper so that the surface reinforcing sheet including woven cloth or unwoven cloth is disposed to be embedded, and the surface of the panel proper is integrally covered by the surface resin layer with the surface reinforcing sheet embedded by foam-curing the expandable synthetic resin by closing the product form block under this condition, and at the same time, film, sheet or board which serves as the surface protection layer is able to be bonded to the panel proper by the surface resin layer.

In the first to fourth manufacturing methods, it is possible to further include a step for integrally covering the outer circumferential end part of the surface protection layer, which integrally covers the surface of the panel proper, with the panel proper by the end part protection layer.

According to the lightweight cement panel of the present invention, since the panel proper surface is integrally covered with a surface reinforcing sheet composed with woven cloth or unwoven cloth, flexural strength of the lightweight cement panel can be improved and at the same time, protection performance of the panel proper surface can be improved.

The lightweight cement panel according to the present invention provides light weight, high strength, and good workability, and is able to be used for a substitute for plywood. In addition, because the lightweight cement panel of the present invention is primarily made of cement as main material, and no lumber resources are used as is the case with wooden plywood, the use of lumber resources from tropical forest can be reduced and contribution can be made to environmental conservation. In addition, because the lightweight cement panel according to the present invention provides higher durability and greater number of repetitive uses than plywood, using the lightweight cement panel in place of plywood as concrete formwork panels can reduce the discharge rate of construction wastes and can also reduce the construction cost. Furthermore, in the event that the lightweight cement panel is used for concrete formwork, curing failure of the concrete surface due to lixivium does not occur as is the case with plywood. Furthermore, since no vinyl acetate-based adhesives are used as is the case with plywood, hazardous gas when plywood is incinerated is not generated at the time of wastes disposal, and even in the event that the lightweight cement panel is used for construction material, the lightweight cement panel is free of any sick-house problem, and is able to be used for clean rooms.

Furthermore, the lightweight cement panel of the present invention comprises a panel proper made up with lightweight cement, porous compact having a large amount of air bubbles, which is formed by, for example, dispersing foam of foaming agent, and surface reinforcing sheet that covers the surface of the panel proper, and surface protection layer, and since the lightweight cement panel provides the specific gravity of 1.0 or less and is as light as plywood, the lightweight cement achieves outstanding handleability as well as workability and at the same time, is free of weight increase due to water absorption or degraded strength as is the case with plywood.

In addition, because the porous compact has a structure reinforced by twining of reinforcing fibers contained in the dispersion state, the lightweight cement panel according to the present invention provides outstanding nailing and other processing capabilities, while the lightweight cement panel provides high strength with the modulus in bending of, for example, 1700 N/mm$^2$, and nails driven are securely held by reinforcing fibers contained in the compact.

Consequently, the lightweight cement panel according to the present invention can be suitably used for construction material applications such as wall material of architectural structures, floor material, ceiling material, and furthermore, heat insulation material of partitions, etc., and furthermore for concrete formwork.

In the lightweight cement panel of the present invention, no particular limitation is made for the amount of reinforcing fibers contained in lightweight cement which composes the panel proper, but by compounding about 0.5 to 5 parts by weight to 100 parts by weight of cement, the reinforcing structure by twining of reinforcing fibers contained in the dispersion state in the compact is formed, and for example, when it is used for concrete formwork, sufficient strength can be secured with respect to the casting concrete pressure. There is no limitation to the type of reinforcing fiber but Vinylon, which is polyvinyl alcohol fiber, polyolefin-based fiber such as polypropylene fiber, polyethylene fiber, etc., aramide fiber, carbon fiber, steel fiber, glass fiber, etc. can be mentioned. In particular, Vinylon, which is polyvinyl alcohol fiber, is preferable because it provides high durability and superb affinity to cement. In addition, for the fiber length of reinforcing fiber, when it is less than 4 mm, reinforcing effects tend to lack. While as the fiber length increases, there is a case in which the dispersibility lowers and the reinforcing fiber in the compact is unevenly distributed and the panel strength may be lowered, and therefore, it is preferable to set to a range between 4 and 35 mm.

The panel proper of the present invention may be fabricated by forming the cement kneaded mixture into a sheet form of a desired size but may be fabricated by slicing into a sheet of a desired thickness and a size after the mixture is formed into a large block shape or by covering the outer circumferential side surface with an expandable synthetic resin layer and slicing it into the desired thickness and the size after the mixture is formed into a large block shape. Furthermore, it is also possible to cover the outer circumferential side surface with the expandable synthetic resin with the reinforcing sheet which serves as the side surface reinforcing sheet temporarily fixed to the outer circumferential side surface after a large block is formed, and this is sliced into a sheet of a desired thickness and size to fabricate the panel proper. In the event that the mixture is sliced into a sheet form after it is formed into a block shape, it is possible to form a large number of panels by one cement form block, and curing and solidification can be conducted as a whole, and the productivity is improved. In addition, in the event that the mixture with outer-circumferential side surface covered with an expandable synthetic resin layer is sliced after the mixture is formed into a large block form, the productivity can be still more improved and at the same time, the expandable synthetic resin layer can be formed in advance on the side end face of the panel proper, and the positioning work of the panel proper with respect to the product form block is facilitated.

In the event that a surface resin layer that covers the surface of the panel proper is installed, by the surface resin layer, water absorption from the panel surface can be prevented, water resistance of the lightweight cement panel can be improved, and for example, in the event that this lightweight cement is used for concrete formwork, water absorption by excess water or rainfall at the time of concrete casting, and an increase of panel weight due to water absorption can be definitely prevented. In addition, by the surface resin layer, impact resistance performance of the panel proper surface can be improved and breakage of the panel proper surface can be effectively prevented. Furthermore, by the surface resin layer, the concrete cast surface can be beautifully finished, and separation of lightweight cement panels from cast concrete can be improved, too. Furthermore, because the surface resin layer functions as an adhesive for bonding the surface reinforcing sheet to the panel proper, it is possible to impart multiple functions to the surface resin layer.

When a side part foam layer composed with expandable synthetic resin is provided at the side end face of the panel proper composed with lightweight cement, that is, the end grain surface of the panel proper, impact when the lightweight cement panel falls can be absorbed by the side part foam layer, and damage such as panel cracking, breakage, etc. can be prevented. In addition, by the side part foam layer, water absorption from the end grain surface of the panel proper can be prevented, and water resistance of the lightweight cement panel can be improved, and an increase of panel weight due to water absorption can be prevented.

Furthermore, when the side surface reinforcing sheet composed with woven cloth or unwoven cloth is installed between the side end face of the panel proper and side part foam layer, strength and rigidity against bend or twist of the lightweight cement panel can be still more improved. Furthermore, when the surface reinforcing sheet and side surface reinforcing sheet are installed, the use of glass fiber made unwoven cloth of weight per square meter of 50-1000 g/m$^2$ can improve strength and rigidity against bend or twist while suppressing an increase of panel fabrication cost.

When the surface of the surface reinforcing sheet is integrally covered with the surface protection layer, water absorption from the panel surface can be prevented by the surface protection layer, the water resistance of the lightweight cement panel can be improved, and for example, in the event that this lightweight panel is used for concrete formwork, water absorption by excess water and rainfall at the time of concrete casting can be prevented, and an increase of panel weight due to water absorption can be definitely prevented. Furthermore, by the surface protection layer, the concrete cast surface can be beautifully finished, and separation of lightweight cement panels from cast concrete can be improved, too.

The surface protection layer can be configured with non-expandable synthetic resin. When the surface protection layer is configured with non-expandable synthetic resin, water absorption from the panel surface can be definitely prevented by the non-expandable synthetic resin and a smooth and beautiful concrete cast surface can be obtained and at the same time, the mold release capability from cast concrete is also improved.

Furthermore, when the outer-circumferential end part of the surface protection layer is covered with the end part protection layer, water absorption from the outer-circumferential end face of the surface protection layer can be prevented, and water resistance and durability can be still more improved, and t the same time, exfoliation of the surface protection layer from the outer circumferential end part can be effectively prevented. The surface protection layer can be formed by any optional method, such as forming by affixing sealing tape with water-tightness, forming by heat-sealing films and sheets composed with synthetic resin material which is compatible with the surface protection layer, or forming by immersing the material in synthetic resin material which is compatible with the surface protection layer, and others.

BRIEF DESCRIPTION OF THE DRAWINGS

FIG. 1 is a cross-sectional view that shows an embodiment of a lightweight cement panel of the present invention;

FIG. 2 is a cross-sectional view of a panel with the surface protection layer and the surface reinforcing sheet integrally bonded to the surface of the panel proper by adhesives, which is another embodiment of the lightweight cement panel of the present invention;

FIG. 3 is a cross-sectional view of a panel with a surface protection layer composed with non-expandable synthetic resin, which is another embodiment of the lightweight cement panel of the present invention;

FIG. 4 is a cross-sectional view of a panel installed with the surface protection layer composed with paper laminated by non-expandable synthetic resin, which is another embodiment of the lightweight cement panel of the present invention;

FIG. 5 is a cross-sectional view of a panel installed with a surface protection layer composed with paper bonded by non-expandable synthetic resin, which is still another embodiment of the lightweight cement panel of the present invention;

FIG. 6 is a cross-sectional view of a panel with the surface of the panel proper covered with a surface resin layer, above which the surface protection layer installed, which is still another embodiment of the lightweight cement panel of the present invention;

FIG. 7 is a cross-sectional view of a panel with the surface reinforcing sheet installed to be embedded on the surface resin layer, which is still another embodiment of the lightweight cement panel of the present invention;

FIG. 8 is a cross-sectional view of a panel with a surface reinforcing sheet installed to be embedded on the surface resin layer and with a side face reinforcing sheet installed to be embedded between the panel proper and the side face foam layer, which is still another embodiment of the present invention;

FIG. 9 is a cross-sectional view of a panel with the surface protection layer and the surface reinforcing sheet bonded to the panel proper by adhesives and the side face reinforcing sheet installed to be embedded between the panel proper and the side face foam layer, which is still another embodiment of the present invention;

FIG. 10 is an illustration when the panel proper is cut from a block-form porous compact, which is another embodiment of a method for manufacturing the panel proper of the lightweight cement panel of the present invention;

FIG. 11 is an illustration when the panel proper is cut from block-form porous compact covered with the side part foam layer, which is still another embodiment of a method for manufacturing the panel proper of the lightweight cement panel of the present invention;

FIG. 12 is an illustration of a block-form porous compact with the side face reinforcing sheet temporarily fixed, which is still another embodiment of a method for manufacturing the panel proper of the lightweight cement panel of the present invention;

FIG. 13 is an illustration when the panel proper is cut from a block-form porous compact with the surface of the side face reinforcing sheet further covered with the side-part foam layer, which is the same embodiment; and FIG. 14 is a perspective view that shows one embodiment of a concrete form using the lightweight cement panel of the present invention, and FIG. 14A shows the surface side and FIG. 14B the rear surface side.

DETAILED DESCRIPTION OF THE INVENTION

FIG. 1 is a cross-sectional view that shows one embodiment of a lightweight cement panel 1 according to the present invention. A lightweight cement panel 1A of the embodiment shown in FIG. 1 includes a panel proper 2 composed with lightweight cement, a surface reinforcing sheet 4 composed with woven cloth or unwoven cloth that integrally covers a surface 2a of the panel proper 2, a surface protection layer 5 that integrally covers the surface of the surface reinforcing sheet 4, and an end part protection layer 6 that covers an outer-circumferential end part of the panel proper 2, the surface reinforcing sheet 4, and the surface protection layer 5. However, it should be noted that the embodiment in which at least either one of the surface protection layer 5 or the end part protection layer 6 is omitted belongs to the range of the present invention.

The panel proper 2 composed with the lightweight cement is composed with a porous compact 8 that contains, for example, reinforcing fiber 7 and a large number of air bubbles (not illustrated) in a dispersion state. The porous compact 8 can be obtained by filling, curing, and solidifying a mixture formed by kneading, for example, cement, water, reinforcing fiber, and foam obtained by prefoaming a foaming agent in a cement form block.

The cement is not particularly limited but conventional Portland cement, high-early-strength Portland cement, super high-early strength Portland cement, and other various kinds of cement can be used. Of these, high-early-strength Portland cement is preferable from the viewpoint of productivity, strength, etc.

The blending ratio of cement to water is preferably a range between 20 and 100 parts by weight of water with respect to 100 parts by weight of cement, and more preferably, a range between 20 and 50 parts by weight of water. An excessively large volume of water tends to lower the strength and an excessively short volume of water tends to lower the fluidity of cement mixture and impede formability at the time of forming.

Examples of the reinforcing fiber 7 include polyvinyl alcohol fiber (Vinylon), polyolefin-based fiber such as polypropylene fiber, polyethylene fiber, etc., aramide fiber, carbon fiber, steel fiber, glass fiber, and others. Of these fibers, Vinylon fiber is preferable, because it provides high durability and at the same time has outstanding affinity to cement. The fiber length of the reinforcing fiber 7 is not particularly limited but is preferable in the range between 4 and 35 mm. When the fiber length of the reinforcing fiber 7 is less than 4 mm, reinforcing effects tend to be insufficient. It is advantageous to have longer fiber length for the reinforcing fiber 7 from the viewpoint of reinforcing effect but on the other hand, as the fiber length increases, there is a case in which the dispersibility lowers and the reinforcing fiber 7 in the compact is unevenly distributed and the panel strength may be lowered. In addition, there is no particular limitation to thickness of the reinforcing fiber 7 but in general, 10 μm to 100 μm thick is used.

The panel proper 2 can achieve a reinforcing structure by entwining of the reinforcing fiber 7 as shown in FIG. 1 only by uniformly dispersing the reinforcing fiber 7 of Vinylon, glass chops, etc. when cement is kneaded. Consequently, in manufacturing the panel, no complicated operation such as positioning operation is required when net reinforcing member and other reinforcing member is embedded, and panels free of variations in strength can be easily fabricated.

The compounding amount of the reinforcing fiber 7 is preferably 0.5 to 5 parts by weight for 100 parts by weight of the cement. When the compounding amount of the reinforcing fiber 7 is small, the reinforcing effect is low, and the panel strength becomes low. The greater the compounding amount of the reinforcing fiber 7, the more advantageous is the panel reinforcing effect, but the excessive compounding amount of the reinforcing fiber 7 degrades dispersibility in the cement mixture and causes the reinforcing fiber 7 to be unevenly distributed, and nonuniform panel strength results, and there is a fear of all the more lowering the panel strength. From this kind of viewpoint, the preferable range of the compounding amount of the reinforcing fiber 7 is 0.5 to 3 parts by weight for 100 parts by weight of cement.

The foaming agent is not particularly limited, but foaming agents for cement and concrete, for example, protein-based, surfactant-based, resin-based, and other publicly known various kind of foaming agents can be used. Furthermore, together with the above-mentioned foaming agent, metal-based foaming agents such as aluminum powder may be used. The addition amount and the method of adding the foaming agent are not particularly limited but in general, the addition amount should be properly adjusted to achieve the target specific gravity for panel of 1.0 or less within the range of 0.1 to 3 parts by weight for 100 parts by weight of cement. The specific gravity of panel is preferably between 0.5 and 1.0, and more preferably between 0.6 and 0.9, and particularly preferably between around 0.7 and 0.8, as is the case with that of wood-based plywood. The smaller the specific gravity, the lighter is the panel weight and more advantageous from the viewpoint of handleability. However, the smaller the specific gravity, the greater is the porosity and the more degraded is the panel strength. On the other hand, the greater the specific gravity, the heavier is the panel and the more degraded is the handleability.

In the event of kneading a mixture consisting of the cement, water, reinforcing fiber, and foam with the foaming agent prefoamed, and other additives, etc., a conventional publicly known cement mixer, concrete mixer, etc. may be used, but it is important to uniformly knead the whole mixture without damaging the state of the foam (air bubbles) obtained by prefoaming the foaming agent as well as the reinforcing fiber in the mixture. In the event that the foam (air bubbles) of the foaming agent is damaged during kneading, the size of air bubbles in the formed panel becomes nonuniform and variations may be generated in the panel strength. Furthermore, when the reinforcing fiber is damaged, the desired reinforcing effect may not be obtained.

For the panel proper 2, cement, water, reinforcing fiber, and foam obtained by prefoaming the foaming agent are kneaded, filled into cement form block, and formed into a sheet of a size that meets the intended use or formed into a block larger than that, then, the cement milk containing air bubbles is hardened by hydration reaction between cement and water and a lightweight porous compact containing reinforcing fiber and a large quantity of air bubbles in the dispersion state is obtained. The thickness of the panel proper 2 is usually between about 8 and 30 mm.

To cite an instance of a specific manufacturing method of panel proper 2 composed with lightweight cement, water and a water-reducing agent are mixed in cement, to which reinforcing fiber is mixed, and the mixture is kneaded. On the other hand, air is introduced into the foaming agent and is prefoamed to a predetermined multiplying factor, for example, about 20 times. Foam obtained by prefoaming this foaming agent is added to the mixture and kneaded. By the way, the specific gravity of the mixture may be suitably measured in the midst of kneading and foam with the foaming agent prefoamed may be further added and kneaded to bring the specific gravity to the target value. This cement mixture is filled into, for example, a pressure-resistant metal formwork, formed into a sheet form of, for example, 600 mm (width)× 1800 mm (length)×11 mm (thickness), and cured and solidified. By this, the panel proper 2 formed by the porous compact 8 in which cement is solidified and composed with lightweight cement reinforced by twining of the reinforcing fiber 7 dispersed in the compact 8 as shown in FIG. 1 is obtained. In addition, as shown in FIG. 10, the panel may be formed into a large block-form porous compact 8A, and after curing and solidifying, it may be cut into a sheet form of a desired thickness and size. By the way, curing may be regular curing or steam curing, or may be both-combined. In addition, curing is not completed in the cement formwork but steam-curing is performed in the cement form work and at the stage of being solidified to a certain extent, in general, after a few hours, the mixture is taken out from the formwork and further cured. This will shorten the forming cycle in the cement formwork and the productivity will be improved.

For a method for integrally covering the surface reinforcing sheet 4 and the surface protection layer 5 to the panel proper 2, a method for affixing the surface reinforcing sheet 4 and the surface protection layer 5 to the panel proper 2 by adhesives to integrally cover may be adopted as is the case of lightweight cement panel 1B shown in FIG. 2, but as is the case with the lightweight cement panel 1A shown in FIG. 1, a method for integrally covering the surface of the panel proper 2 by a surface resin layer 9 composed with synthetic resin, having the surface reinforcing sheet 4 installed to this surface resin layer 9 to be embedded and at the same time having the surface protection layer 5 on the surface of the surface resin layer 9, and affixing the surface reinforcing sheet 4 and the surface protection layer 5 to the panel proper 2 by the synthetic resin which composes the surface resin layer 9 to integrally cover is preferable. In such event, by the surface layer 3 composed with the surface reinforcing sheet 4, surface protection layer 5 and the surface resin layer 9, the strength of the lightweight cement panel 1A is increased, and at the same time, surface properties, water resistance, and furthermore the form releasing capability from cast concrete are improved when the panel is used for concrete formwork. It is preferable to install the surface layer 3 in such a manner as to cover both front and rear surfaces of the panel proper 2 but the method for installing the surface layer 3 in such a manner as to cover one surface 2a only belongs to the range of the present invention. In addition, in the event that no surface protection layer 5 is provided, the surface reinforcing sheet 4 is disposed to be embedded in the surface resin layer 9, and by the synthetic resin composing the surface resin layer 9, the surface reinforcing sheet 4 is bonded to the panel proper 2.

For the surface reinforcing sheet 4, woven cloth or unwoven cloth composed with fiber material such as polyvinyl alcohol fiber (Vinylon), polypropylene fiber, polyethylene fiber, and other polyolefin-based fiber, aramide fiber, carbon fiber, steel fiber, glass fiber, and others and mesh-form woven cloth or unwoven cloth having a large quantity of comparatively large through-holes can be adopted so that the surface resin layers 9 on both sides with the surface reinforcing sheet 4 in between are integrated. In particular, a chopped strand mat having glass fiber of 50-1000 $g/m^2$ weight per square meter and preferably 200-300 $g/m^2$ weight per square meter is preferable because it can be available at low cost and it can greatly improve the strength and rigidity of the lightweight cement panel 1A. The surface reinforcing sheet 4 may be installed to be embedded in the surface resin layer 9, and it is preferable to have it to be embedded in the middle of the thickness direction of the surface rein layer 9 but it may be installed to be embedded in the surface part of the surface resin layer 9 or in the side part of the panel proper 2. When the surface reinforcing sheet 4 is installed to be embedded in the surface resin layer 9, strength and rigidity of the lightweight cement panel 1A against bend and twist can be still more improved and at the same time, the protection performance of the panel proper 2 can be still more improved. In addition, because the surface reinforcing sheet 4 is configured by woven cloth or unwoven cloth, the adhesion of the surface resin layer 9 disposed on the surface side and the rear side of the surface reinforcing sheet 4 can be sufficiently secured.

There is no particular limitation to the material of the surface protection layer 5, but for example, it can be configured by non-expandable synthetic resin, paper, and furthermore, paper covered with non-expandable synthetic resin. Preferable examples of non-expandable synthetic resin include polyethylene, polypropylene and other polyolefin-based resin, polyethylene terephthalate and other polyester-based resin, as well as ABS, MMA, and other synthetic resin with good mold-releasing capabilities from cast concrete when the panel is used for a concrete formwork. The surface of film, sheet, or board composed with synthetic resin that configures the surface protection layer 5 may be corona-discharge-treated or these surfaces may be surface-treated with acid to improve the adhesion between the surface protection layer 5 and the surface 2a of the film proper 2. The film, sheet, or board, paper, etc. made of synthetic resin that configures the surface protection layer 5 may be a single layer or multiple-layers. In this way, by providing the surface protection layer 5 by affixing film, sheet, or board composed with non-expandable synthetic resin or applying synthetic resin to the outermost layer of the lightweight cement panel 1A, water absorption from the panel surface can be definitely prevented, and in addition, when the panel is used for concrete formwork, the smooth and beautiful concrete cast surface can be obtained, and furthermore, satisfactory mold-releasing capabilities from the cast concrete can be also achieved.

The synthetic resin that forms the surface resin layer 9 is not particularly limited, but examples include polystyrene foam, polyethylene foam, hard polyurethane foam, soft polyurethane foam, hard vinyl chloride foam, urea foam, phenol foam, acrylic foam, acetylcellulose foam, and other expandable synthetic resins. In addition, it is possible to adopt polystyrene resin, polyethylene resin, hard polyurethane resin, soft polyurethane resin, hard polyvinyl chloride resin, urea resin, phenol resin, acrylic resin, acetylcellulose resin, and other nonfoaming synthetic resin.

For the method for forming the surface resin layer 9 by expandable synthetic resin, generally publicly known methods are applicable. Of these, three types of foaming methods of polyurethane foam, urea foam, and phenol foam are shown as follows as its typical examples.

Polyurethane foam is obtained by polyol, excess diisocyanate, cross-linking agent, foaming agent, catalyst, air-bubble size adjusting agent, and as a foaming agent, carbon dioxide by reactions of water and isocyanate, methylene dichloride, pentane, air injected at the time of mechanical mixing, etc. and organic-based foaming agent of decomposition type are used. For the air-bubble size adjusting agent, silicone resin and emulsifier can be used, and for the catalyst, amines, organic tin compounds can be used.

Urea foam is obtained by dispersing 2 to 30 parts of a foaming agent such as propane, butane, butene, hexane, or methyl chloride in 100 parts of viscous urea-formaldehyde aqueous solution (resin content: 50-90%) of about 1000 cp viscosity in a low-temperature or hermetically sealed container, adding an acid catalyst in the presence of an emulsifier, and then, raising temperature to 15 to 115° C. Additionally, urea resin initial condensate containing an emulsifier may be discharged while mechanically frothing by a site foaming machine with hydrochloric acid liquid being mixed.

Phenol foam is obtained by mixing a curing agent with stirring and allowing it to adhere to the target portion or filling while air is being injected by a foaming machine to the resole initial concentrate to be pureed. Furthermore, foaming may be aided by adding bicarbonate of soda about 1% when the resole initial concentration is pureed. By this method, after the curing agent is added, the concentrate is quickly hardened. For the oxidation catalyst, benzenesulfonic acid, toluenesulfonic acid, sulfonic acid, phosphoric acid, etc. are used. In addition, when a volatile foaming agent is compounded, foam is generated by reaction heat and no initial whipping is required. Phenol resin suited for foaming is commercially available, and tough foam can be fabricated by copolymerizing 85 parts of resole and 5 parts of polyamide obtained from adipic acid and hexamethylenediamine, and toughness, elasticity, etc. may be supplemented by compounding about 5 to 20 parts of polyvinyl alcohol and polyvinyl chloride resin.

There is no limitation to the foaming multiplication factor of the surface resin layer 9, but in general, about 2 to 10 times are acceptable. The smaller the foaming multiplication factor of the surface resin layer 9, the larger is the panel strength, but on the other hand, the greater is the panel weight, too. In addition, as the foaming multiplication factor of the surface resin layer 9 increases, the panel weight is reduced, but on the other hand, the panel strength tends to lower. Consequently, the foaming multiplication factor of the surface resin layer 9 is suitably decided from the viewpoint of panel light weight, strength, impact resistance, etc. In addition, the thickness of the surface resin layer 9 disposed on the front and rear of the surface reinforcing sheet 4 is set to about 0.5 to 2 mm.

It is preferable to have the surface resin layer 9 with little continuous air bubbles or composed with independent air bubbles free of continuous air bubbles from the viewpoint of outstanding water resistance, surface properties, mold releasing capabilities from cast concrete when the panel is used for concrete formwork, etc.

In the lightweight cement panel 1A of FIG. 1, the surface layer 3 is set to the size same as the total surface of the panel proper 2, and the outer-circumferential end part of the surface layer 3 is disposed along the outer-circumferential end part of the panel proper 2, and the panel proper 2 and the outer-circumferential end part of the surface layer 3 are integrally covered by the end part protection layer 6. And by this end part protection layer 6, water absorption from the outer-circumferential end face of the surface layer 3 can be prevented, and water resistance and durability of the lightweight cement panel 1A can be still more improved, and at the same time, it is possible to prevent the surface layer 3 from being exfoliated from the outer circumferential end part.

The end part protection layer 6 can be formed by any optional method, such as forming by affixing sealing tape with water tightness, forming by bonding or heat-fusing a synthetic resin made film, sheet, or forming by applying synthetic resin to the outer-circumferential end part of the panel proper 2, and others. In addition, synthetic resin frame material with L-letter shape cross-section may be fitted along the side end part of the panel proper 2, fixed by adhesives to form the end part protection layer 6. Preferable examples of synthetic resin that configures the end part protection layer 6 include polyethylene, polypropylene and other polyolefin-based resin, polyethylene terephthalate and other polyester-based resin, ABS, MMA, etc. The polymerization width of the end part protection layer 6 and the surface layer 3 may be optionally set but may be set to about 3 mm to 20 mm.

FIG. 3 shows still another embodiment of lightweight cement panel 1 according to the present invention. A lightweight cement panel 1C of the embodiment shown in FIG. 3 has the surface 2a of the panel proper 2 composed with lightweight cement integrally covered with the surface protection layer 5, the side end face 2b of the panel proper 2 integrally covered with the side part foam layer 10 composed with expandable synthetic resin, and the outer circumferential end part and the side part foam layer 10 of the surface protection layer 5 covered with the end part protection layer 6. By the way, in FIG. 3, structures that are in common with those in FIG. 1 are denoted by the same reference numerals and their explanations are omitted.

The expandable synthetic resin that composes the side part foam layer 10 is not particularly limited but may be able to be configured with the expandable synthetic resin same as the surface resin layer. There is no particular limitation to the foaming multiplication factor of the side part foam layer 10, but in general, it may be between about 2 and 10 times. The smaller the foaming multiplication factor of the side part foam layer 10, the more increased is the panel strength, but on the other hand, the panel weight is increased, too. In addition, as the foaming multiplication factor of the side part foaming layer 10 increases, the panel weight is reduced, but on the other hand, the panel strength tends to degrade. Consequently, the foaming multiplication factor of the side part foaming layer 10 should be suitably decided from the viewpoint of panel light weight, strength, impact resistance, etc. In addition, the thickness of the side part foaming layer 10 can be set to the thickness nearly same as that of the panel proper 2, and the width is not particularly limited but it is set to about 2 to 10 mm so that impact at the time of fall of the lightweight cement panel 1C can be effectively absorbed.

The method for integrally covering the side end face 2b of the panel proper 2 with the side part foam layer 10 is not particularly limited, but to mention one example, the side end face 2b of the panel proper 2 is integrally covered by the side part foam layer 10 by foaming and curing the expandable synthetic resin filled in the periphery of the panel proper 2 formed with lightweight cement in the hermetically sealed product form block. To be more specific, first of all, in the center part of the product form block which has an inner space slightly larger than the panel proper 2, the panel proper 2 is positioned and mounted, and then, the outer-circumferential side of the panel proper 2 is filled with expandable synthetic resin, and then, with the product form block hermetically sealed, the filled expandable synthetic resin is foamed and cured so that the side end face 2b of the panel proper 2 is covered with the side part foam layer 10. In this way, by foaming and curing the expandable synthetic resin in the hermetically sealed product form block and installing the side part foam layer 10, the side part foam layer 10 is formed into a smooth surface with the surface covered with skin layer free of air bubbles. By the way, the side part foam layer 10 formed by independent air bubbles with little continuous air bubbles or free of continuous air bubbles is preferable because of superb water resistance, surface properties, and mold-releasing capabilities, etc. from the cast concrete, when it is used for a concrete formwork. In addition, as shown in FIG. 11, for the side end face of the panel proper 2, the panel proper 2A with the side part foam layer 10 formed in advance may be used, too. For a specific manufacturing method of this kind of panel proper 2A, the panel proper 2A may be fabricated by loading the porous compact 8A mounted to the center part of a hermetically sealed foam-molding form block which has an inner space larger than the block-form porous compact 8A, filling the clearance between the porous compact 8A and the foam-molding form block with expandable synthetic resin to foam and cure, and as shown in FIG. 11, covering the outer circumferential side surface of the porous compact 8A with the side part foam layer 10, and then, slicing this into sheets of a desired thickness and size. The side part foam layer 10 may be installed at least to the outer circumferential four surfaces of the porous compact 8A, and is sliced by a cutting knife such as a disc saw, band saw, etc. so that the side part foam layer 10 is disposed on the outer circumferential part of the panel proper 2A.

As shown in FIG. 3, the surface protection layer 5 is set to a size same as the entire surface of the lightweight cement panel 1C, and the outer circumferential end part of the surface protection layer 5 is disposed along the outer circumferential end part of the side part foam layer 10. By configuring in this way, the length of the superimposed portion of the surface protection layer 5 and the end part protection layer 6 installed in such a manner as to cover the outer circumferential part of the surface protection layer 5 is set to be as large as possible so that intrusion of water from the outer circumferential end part of the lightweight cement panel 1C can be effectively prevented. However, the outer circumferential end part of the surface protection layer 5 may be installed up to the midway part of the side part foam layer 10 or up to the outer circumferential end part of the panel proper 2. In addition, it is a preferable embodiment to configure in such a manner that the outer circumferential end part of the surface protection layer 5 is covered with the side part foam layer 10.

In addition, in the lightweight cement panel 1C, the outer circumferential end part of the surface protection layer 5 and the side part foam layer 10 are integrally covered by the end part protection layer 6. And by this end part protection layer 6, water absorption from the outer circumferential end face of the surface protection layer 5 can be prevented, and water resistance and durability of the lightweight cement panel 1C can be still more improved, and at the same time, it is possible to prevent the surface protection layer 5 from being exfoliated from the outer circumferential end part or the side part foam layer 10 from coming off from the panel proper 2. However, this end part protection layer 6 is preferably installed from the viewpoint of preventing exfoliation of the surface protection layer 5 or drop-off of the side part foam layer 10, but embodiments with these omitted are included in the range of the present invention.

In addition, in order to increase the installation strength of the side part foam layer 10 for the panel proper 2, it is preferable to provide the end part protection layer 6 so that at least the boundary between the panel proper 2 and the side part foam layer 10 are included. Furthermore, providing the end part protection layer 6 that integrally covers the outer circumferential end part of the surface protection layer 5 to the side part foam layer 10 of the side end face of the panel proper 2 enables forming of the end part protection layer 6 simultaneously with the side part foam layer 10 and an increase of the fabrication cost can be suppressed, which is preferable.

FIG. 4 shows still another embodiment of the lightweight cement panel 1 according to the present invention. A lightweight cement panel 1D related to this embodiment has the surface protection layer 5 composed with a non-expandable synthetic resin layer 11 and paper 12 provided for the surface 2a of the panel proper 2 in place of the surface protection layer 5 composed with non-expandable synthetic resin in the lightweight cement panel 1C, and except this, all others are configured in the same manner as the lightweight cement panel 1C. As the non-expandable synthetic resin 11, various kinds of synthetic resins can be mentioned, such as polyethylene, polypropylene, polyethylene terephthalate, etc. as mentioned above. This non-expandable synthetic resin 11 may be directly bonded to the surface of paper 12 by thermal laminate, etc. or like lightweight cement panel 1E shown in FIG. 5, film-form, sheet-form or board-form non-expandable synthetic resin layer 11 may be bonded to the paper 12 via an adhesive 13. For the type of adhesives, there is no particular limitation and with adhesiveness to both the synthetic resin material that composes the non-expandable synthetic resin layer 11 and the paper 12 taken into account, any adhesives may be suitably selected from publicly known adhesives and used. Furthermore, as the adhesives that bond the non-expandable synthetic resin layer 11 to the paper 12, the expandable synthetic resin same as the expandable synthetic resin that composes the side part foam layer 10 may be used, and in the formwork, coating and forming of the side-part foam layer 10 for the surface 2a and the side end face 2b of the panel proper 2, bonding of paper 12 to the side-part foam layer 10, and bonding of the non-expandable synthetic resin layer 11 (film-form, sheet-form or board-form) to the paper 12 may be carried out in the same process. By the way, in FIG. 4 and FIG. 5, for structures in common with FIG. 3, same reference numerals are given and the explanation is omitted.

As described above, by providing the surface protection layer 5 to the surface 2a of the panel proper 2 and bonding films, sheets, or boards composed by the non-expandable synthetic resin or applying synthetic resin, in particular, to the outermost layer, to provide the surface protection layer 5, water absorption from the panel surface can be definitely prevented, and when the lightweight cement panel is used for concrete formwork, the smooth and beautiful concrete cast surface can be obtained, and the mold-releasing capabilities from cast concrete can be improved, too. Furthermore, when the surface protection layer 5 is configured with the paper 12, flexural rigidity, elasticity, and impact resistance of the lightweight cement panel 1 are still more increased and the pullout strength of a nail driven into the lightweight cement panel 1 increases, and the nailability is improved, too, which is also preferable. Because in this embodiment, the side part foam layer 10 assumes all the functions of imparting water-proof performance and impact resistance to panel proper 2 as well as bonding functions of the surface protection layer 5 to the panel proper 2, by this, lightweight cement panel with outstanding water resistance and impact resistance can be efficiently manufactured.

FIG. 6 shows still another embodiment of the lightweight cement panel 1 according to the present invention. A lightweight cement panel 1F related to this embodiment has the surface 2a of the panel proper 2 in the lightweight cement panel 1C covered with the surface resin layer 9 composed with synthetic resin and has the surface protection layer 5 installed on it, and for others, the lightweight cement panel 1F is configured in the same manner as the lightweight cement panel 1C. By the way, in FIG. 6, for structures in common with FIG. 3, same reference numerals are given and the explanation is omitted.

The thickness of the surface resin layer 9 is set to about 0.5 to 2 mm. By the way, in the embodiment shown in FIG. 4, the surface resin layer 9 is installed to both front and rear surfaces of the panel proper 2, but it may be installed to either one of the surfaces in accord with panel applications.

The surface resin layer 9 and the side part foam layer 10 of the side end face of the panel proper 2 may be configured by dissimilar material but it is preferable to configure with the same material and to form simultaneously or separately. In the event that they are simultaneously formed, for example, in hermetically sealable product form block, expandable synthetic resin, which is filled into the periphery of the panel proper 2 composed with lightweight cement, is foamed and cured, and the surface 2a and the side end face 2b of the panel proper 2 are thereby integrally covered by the surface resin layer 9 and the side part foam layer 10. To be more specific, first of all, in the lower part of the product form block which has an inner space slightly larger than the panel proper 2, expandable synthetic resin is filled, the panel proper 2 is positioned and mounted at the center part of the product form block, the outer-circumferential side and the upper part of the panel proper 2 are filled with expandable synthetic resin in such a manner that expandable synthetic resin is filled as if it wraps around the panel proper 2, and then, with the product form block hermetically sealed, the filled expandable synthetic resin is foamed and cured so that t the panel proper 2 is covered with the surface resin layer 9 and the side part foam layer 10. In this way, by foaming and curing the expandable synthetic resin in the hermetically sealed product form block and installing the surface resin layer 9 and side part foam layer 10, the surface resin layer 9 is formed into a smooth surface with the surface covered with skin layer free of air bubbles, and at the same time, pores of the surface of the panel proper 2 composed with the porous compact 8 are sealed and water absorption from the panel surface can be prevented. By the way, the surface resin layer 9 and the side part foam layer 10 formed by independent air bubbles with little continuous air bubbles or free of continuous air bubbles are preferable because of superb water resistance, surface properties, and mold-releasing capabilities, etc. from the cast concrete, when it is used for concrete formwork. In addition, when the surface resin layer 9 and the side part foam layer 10 are formed separately, by the method shown in FIG. 11, the panel proper 2A with the side part foam layer 10 formed on the outer circumferential part is fabricated, and with the expandable synthetic resin filled in the lower part of the product form block inside, this panel proper 2A is positioned and mounted to the center part of the product form block, the upper side of the panel proper 2A is filled with the expandable synthetic resin, with the product form block hermetically sealed, the filled expandable synthetic resin is foamed and cured so that the surface resin layer 9 and the side part foam layer 10 can be installed separately for the panel proper 2.

In addition, the surface protection layer 5 may be bonded to the surface resin layer 9 by adhesives but when the surface resin layer 9 is formed, at the time of foaming and curing expandable synthetic resin that composes the surface resin layer 9, the surface protection layer 5 may be directly bonded to the panel proper 2 by the expandable synthetic resin, too. For example, with the sheet, film, or board which serve as the surface protection layer 5 disposed in the inner surface of the form block, expandable synthetic resin filled in the circumference of the panel proper 2 is foamed and cured, and the surface 2a and the side end face 2b of the panel proper 2 are integrally covered by the surface resin layer 9 and the side part foam layer 10, and at the same time, the surface protection layer 5 may be bonded with the expandable synthetic resin used as an adhesive.

FIG. 7 is a cross-sectional view that shows another embodiment of the lightweight cement panel 1 according to the present invention. A lightweight cement panel 1G related to this embodiment is the lightweight cement panel 1F with the surface resin layer 9 provided with the surface reinforcing sheet 4 composed with woven cloth or unwoven cloth to be embedded, and for others, it is configured in the same manner as the lightweight cement panel 1F. For the surface reinforcing sheet 4, woven cloth or unwoven cloth composed with fiber material such as polyvinyl alcohol fiber (Vinylon), polypropylene fiber, polyethylene fiber, and other polyolefin-based fiber, aramide fiber, carbon fiber, steel fiber, glass fiber, and others may be adopted. In particular, a chopped strand mat having glass fiber of 50-1000 g/m$^2$ weight per square meter and preferably 200-300 g/m$^2$ weight per square meter is preferable because it can be available at low cost and it can greatly improve the strength and rigidity of the lightweight cement panel 1. The surface reinforcing sheet 4 may be installed to be embedded in the surface resin layer 9, and it is preferable to have it to be embedded in the middle of the thickness direction of the surface resin layer 9 but it may be installed to be embedded in the surface part of the surface resin layer 9 or the side part on the panel proper 2 side. When the surface reinforcing sheet 4 is installed to be embedded in the surface resin layer 9, strength and rigidity of the lightweight cement panel 1E against bend and twist can be still more improved and at the same time, the protection performance of the panel proper 2 can be still more improved. In addition, because the surface reinforcing sheet 4 is configured by woven cloth or unwoven cloth, the adhesion of the surface resin layer 9 disposed on the surface side and the rear side of the surface reinforcing sheet 4 can be sufficiently secured. By the way, in FIG. 7, for structures in common with FIG. 6, same reference numerals are given and the explanation is omitted.

FIG. 8 is a cross-sectional view that shows another embodiment of the lightweight cement panel 1 according to the present invention. A lightweight cement panel 1H related to this embodiment is the lightweight cement panel 1G with the side face reinforcing sheet 14 composed by woven cloth or unwoven disposed to be embedded between the side end face 2b and side part foam layer 10 of the panel proper 2 and at the same time, the surface protection layer 5 and the end protection layer 6 omitted, and for others, it is configured in the same manner as the lightweight cement panel 1G. However, same as the lightweight panel 1G, the surface protection layer 5 and the end part protection layer 6 may be installed as shown with virtual lines in FIG. 8.

For the side face reinforcing sheet 14, same as the surface reinforcing sheet, woven cloth or unwoven cloth composed with fiber material such as polyvinyl alcohol fiber (Vinylon), polypropylene fiber, polyethylene fiber, and other polyolefin-based fiber, aramide fiber, carbon fiber, steel fiber, glass fiber, and others may be adopted. In particular, a chopped strand mat having glass fiber of 50-1000 g/m$^2$ weight per square meter and preferably 200-300 g/m$^2$ weight per square meter is preferable because it can be available at low cost and it can greatly improve the strength and rigidity of lightweight cement panel 1. In this way, installing the side face reinforcing sheet 14 to be embedded in the side end face 2b of the panel proper 2 can improve still more the strength and rigidity of the lightweight cement panel 1H against bend and twist. By the way, in FIG. 8, for structures in common with FIG. 7, same reference numerals are given and the explanation is omitted. In addition, with respect to the lightweight cement panels 1C to 1G, the strength and rigidity of the panel against twist can be improved by installing the side face reinforcing sheet 14 to be embedded in the clearance between the panel proper 2 and the side part foam layer 10.

As a method for manufacturing a lightweight cement panel 1H, for example, the panel proper 2 composed with lightweight cement is fabricated in the same manner as the panel proper 2 of the lightweight cement panel 1A, and to this side end face 2b, a band-form side face reinforcing sheet 14 is temporarily fixed by adhesives or temporary fixing tape. Then, same as lightweight cement panel 1G, the inside of the lower part in the product form block which has an inner space slightly larger than the panel proper 2 is filled with expandable synthetic resin and at the same time, the surface reinforcing sheet 4 of a size (planar shape) nearly same as that of the panel proper is provided to be embedded in the expandable synthetic resin, the panel proper 2 with the side face reinforcing sheet 14 temporarily fixed is positioned and mounted to the center part of the product form block, the outer circumferential side and the upper part of the panel proper 2 are filled with expandable synthetic resin in such a manner that the expandable synthetic resin is filled as if it wraps around the panel proper 2 and at the same time, the surface reinforcing sheet 4 is installed to be embedded in the expandable synthetic resin on the upper side of the panel proper 2, and then, with the product form block hermetically sealed, the filled expandable synthetic resin is foamed and cured to integrally cover the panel proper 2 and the side face reinforcing sheet 14 by the surface resin layer 9 and the side part foam layer 10. By the way, in the event that the surface protection layer 5 and the end protection layer 6 are installed, with the sheet, film, or board which serves as the surface protection layer 5 disposed on the inner surface of the product form block, in the manner same as above, in the product form block, the end protection layer 6 is fabricated by integrally covering the panel proper 2 and side reinforcing sheet 14 with the surface resin layer 9 and the side part foam layer 10 and by affixing water-tight sealing tape to the outer circumferential end part of the molding.

In addition, as the other manufacturing method, as shown in FIG. 10, a large block-form porous compact 8A composed with lightweight cement is fabricated; as shown in FIG. 12, as the material of the side-face reinforcing sheet 14, a reinforcing sheet 14B is temporarily fixed to the outer circumferential side surface of the porous compact 8A by adhesives or temporary fixing tape 15; this is mounted to the center part inside the foam-molding form block; the clearance between the porous compact 8A and the foam-molding form block is filled with expandable synthetic resin, which is allowed to be foamed and cured; as shown in FIG. 13, the outer circumferential side surfaces of the porous compact 8A and the reinforcing sheet 14B are covered with the side-part foam layer 10; this is sliced into a sheet of a desired thickness and size; and a panel proper 2B having the side part foam layer 10 with the side-surface reinforcing sheet 14 embedded in the outer circumferential part is fabricated. And same as above, the lower part inside of the product form block is filled with expandable synthetic resin, and at the same time, the surface reinforcing sheet 4 is installed to be embedded in the expandable synthetic resin, the panel proper 2 is mounted on the product form block, the upper side of the panel proper 2B is filled with expandable synthetic resin and at the same time the surface reinforcing sheet 4 is installed in the expandable synthetic resin, and next, with the product form block hermetically sealed, the filled expandable synthetic resin is foamed and cured; then, to the surface-covered surface resin layer 9, the surface reinforcing sheet 4 is installed to be embedded By the way, in the event that the surface protection layer 5 and the end protection layer 6 are installed, with the sheet, film, or board which serves as the surface protection layer 5 disposed on the inner surface of the product form block, in the manner same as above, the end protection layer 6 is fabricated by filling the lower part of the product form block inside with expandable synthetic resin, disposing the surface reinforcing sheet 4 to be embedded in the expandable synthetic resin, then, mounting the panel proper 2B to the product form block, then, filling the upper side of the panel proper 2B with expandable synthetic resin, disposing the surface reinforcing sheet to be embedded in this expandable synthetic resin, foaming and hardening the filled expandable synthetic resin to dispose the surface reinforcing sheet 4 to be embedded in the surface resin layer 9 covered on the surface with the product form block hermetically sealed, installing the surface protection layer 5 in a laminar form on the surface of the surface resin layer 9, and then, affixing water-tight sealing tape to the outer circumferential end part of the molding.

FIG. 9 is a cross-sectional view that shows another embodiment of the lightweight cement panel 1 according to the present invention. A lightweight cement panel 1J related to this embodiment has the surface resin layer 9 in the lightweight cement panel 1H omitted, has the surface protection layer 5 and the end protection layer 6 provided, and has the surface reinforcing sheet 4 and the surface protection layer 5 integrally bonded to the panel proper 2 by adhesives, and all others are configured in the same manner as the lightweight cement panel 1H. In such event, the lightweight cement panel 1J can be easily fabricated by forming the end part protection layer 6 by bonding the surface reinforcing sheet 4 and the surface protection layer 5 to the surface of the panel proper 2B fabricated as described above by adhesives in a laminar form and by affixing sealing tape with water tightness to the outer-circumferential end part.

The lightweight cement panel 1 of the present invention as described above is able to be extensively used for concrete formwork, wall material of architectural structures, floor material, ceiling material, partitions, and furthermore, heat insulation material incorporated in these materials as well as in the construction field and civil engineering field. For example, the one shown in FIG. 14 is an example used for a concrete formwork panel. The concrete formwork 20 has walling 21 fastened by nails at predetermined positions of the circumference and the midpoint of the rear surface of the lightweight cement panel 1 of the present invention that serves as sheathing. The cement panel 1 which serves as sheathing at least provides the modulus in bending of 1700/mm$^2$ or more, provides sufficient strength that can stand the cast concrete pressure, and at the same time, is lightweight and easy to handle, and as compared to wooden sheathing, can be used more repetitively, resulting in reduction of the cost of concrete casting work. By the way, the walling 21 may be porous material obtained by foam forming cement as is the case with the lightweight cement panel 1.

Example 1

Manufacture of a Panel Proper Formed by a Porous Compact

For 100 parts by weight of early-strength Portland cement, 35 parts by weight of water and 0.3 parts of water-reducing admixture were added and mixed, to which cement milk with Vinylon short fibers added to achieve 1.0 part by weight for 100 parts by weight of cement was mixed and kneaded. On the other hand, air was added to a foaming agent and the mixture was stirred and mixed to be prefoamed 20 times. This prefoamed foaming agent was added to the cement milk in such a manner that one part by weight was achieved for 100 parts by weight of cement and kneaded, and a cement mixture was obtained. This cement mixture was filled into a metal pressure-proof formwork measuring 1780 mm in length by 580 mm in width by 300 mm in height, was cured with steam for 3 hours in a hermetically sealed state, had the formwork removed, was further cured with steam for 21 hours, and then, was cured at room temperature for 6 days, and a block-form compact was obtained. This compact was sliced into a sheet form 11 mm thick and a panel proper formed by a porous compact having a large number of air bubbles was manufactured. The panel proper obtained provided 0.81 specific gravity, 2.73 N/mm$^2$ flexural strength, and 3460 N/mm$^2$ modulus in bending. By the way, the specific gravity was calculated from the size (width by length by thickness) and the mass of the sample. In addition, the flexural strength and modulus in bending conform to JIS A 1408 and were values measured with the distance between support rods (span L, sample width) set to 250 mm.

[Forming of an Expandable Synthetic Resin Layer and Bonding of a Surface Protection Layer]

Using hermetically-sealable pressure-proof formwork which had an inner space (forming space) whose length, width, and height are all slightly larger than the panel proper, expandable urethane resin was filled in the lower part of the formwork inside with a synthetic resin film of a size nearly same as that of the panel proper disposed on the inner surface of the formwork; at the same time, unwoven cloth sheet composed with glass fiber of a size (planar shape) nearly same as that of the panel proper was installed to be embedded in this expandable urethane resin; the panel proper with a belt-like unwoven cloth sheet composed with glass fiber temporarily fixed to the side end face was positioned and mounted to the center part of the form block; expandable urethane resin was filled into a clearance between the panel proper and the inner circumferential surface of the form block; at the same time, expandable urethane resin was filled into the upper part of the form block; an unwoven cloth sheet composed with glass fiber of a size (planer shape) nearly same as that of the panel proper was installed to be embedded in the expandable urethane resin filled in the upper part of the formwork; the resin was foamed and hardened with the form block hermetically sealed; and a lightweight cement panel as shown in FIG. 7 was manufactured. The obtained lightweight cement panel provided outstanding nailability and satisfactory retainability of nails driven. Furthermore, this lightweight cement panel was easily cut by saw as is the case with lumber.

The invention claimed is:

1. A lightweight cement panel, comprising:
   a surface resin layer comprising a synthetic resin integrally covering the entire surface of the panel proper comprising lightweight cement; and
   a surface reinforcing sheet made with woven cloth or unwoven cloth embedded in the surface resin layer; wherein
   the surface reinforcing sheet is adhered to the panel proper by means of the synthetic resin constituting the surface resin layer;
   the surface of the surface reinforcing sheet is integrally covered with a surface protection layer, and
   the specific gravity of the panel proper is within the range between 0.5 and 1.0.

2. The lightweight cement panel according to claim 1, wherein the panel proper is formed by a porous compact produced by filling, curing, and solidifying a mixture prepared by kneading cement, water, reinforcing fibers, and foam obtained by prefoaming a foaming agent in a hermetically sealed cement form block, and contains the reinforcing fibers and foam in a dispersion state in the compact, and provides the specific gravity within the range between 0.5 and 1.0.

3. The lightweight cement panel according to claim 2, wherein 0.5 to 5 parts by weight of the reinforcing fibers are compounded in the mixture with respect to 100 parts by weight of cement.

4. The lightweight cement panel according to claim 2, wherein the reinforcing fibers are polyvinyl alcohol fibers.

5. The lightweight cement panel according to claim 2, wherein the fiber length of the reinforcing fibers is between 4 and 35 mm.

6. The lightweight cement panel according claim 1, wherein the side end face of the panel proper is integrally covered with the side foam layer comprising expandable synthetic resin and the side foam layer surface is integrally covered by the surface reinforcing sheet together with the panel proper.

7. The lightweight cement panel according to claim 6, wherein a side reinforcing sheet comprising woven cloth or unwoven cloth is installed to be embedded between the side end face and side foam layer of the panel proper.

8. The lightweight cement panel according to claim 7, wherein at least one of the surface reinforcing sheet and the side reinforcing sheet comprises unwoven cloth made of glass fibers having a weight per square meter of 50-1000 g/m².

9. The lightweight cement panel according to claim 1, wherein the surface protection layer comprises non-expandable synthetic resin.

10. The lightweight cement panel according to claim 1, further comprising an end part protection layer, wherein the surface reinforcing sheet or the outer-circumferential end part of the surface protection layer is integrally covered with the end part protection layer.

11. A lightweight cement panel for concrete formwork, comprising:
   a panel proper formed comprising a porous compact produced by filling, curing, and solidifying a mixture prepared by kneading cement, water, reinforcing fibers, and foam obtained by prefoaming a foaming agent in a hermetically sealed cement form block, containing the reinforcing fibers and foam in a dispersion state in the compact, and providing the specific gravity within the range between 0.5 and 1.0;
   a side foam layer comprising expandable synthetic resin that integrally covers the side end face of the panel proper;
   a side face reinforcing sheet comprising woven cloth or unwoven cloth installed to be embedded between the side end face of the panel proper and the side foam layer;
   a surface resin layer comprising synthetic resin that integrally covers the surface of the panel proper;
   a surface reinforcing sheet comprising woven cloth or unwoven cloth that is disposed to be embedded in the surface resin layer.

12. A method for manufacturing a lightweight cement panel, comprising steps of:
   disposing a panel proper comprising lightweight cement in a hermetically sealable product form block;
   filling a clearance between the inner surface of the product form block and the surface of the panel proper with expandable synthetic resin so that the surface reinforcing sheet comprising woven cloth or unwoven cloth is disposed to be embedded;
   bonding the surface reinforcing sheet to the panel proper by the surface resin layer by closing the product form block under this condition and foaming and hardening the expandable synthetic resin.

13. The method for manufacturing a lightweight cement panel according to claim 12, wherein a product form block with an inner space slightly larger than the panel proper is used, the circumference of the panel proper is filled with expandable synthetic resin, too, at the time of filling expandable synthetic resin, and the side end face of the panel proper is integrally covered with the side foam layer comprising expandable synthetic resin.

14. The method for manufacturing a lightweight cement panel according to claim 13, wherein the side reinforcing sheet comprising woven cloth or unwoven cloth temporarily fixed to the side end face of the side reinforcing sheet is disposed in the product form block as the panel proper.

15. The method for manufacturing a lightweight cement panel according to claim 12, comprising a step filling, curing, and solidifying a mixture prepared by kneading cement, water, reinforcing fibers, and foam obtained by prefoaming a foaming agent in a hermetically sealed cement form block as a step for manufacturing the panel proper comprising the lightweight cement.

16. The method for manufacturing a lightweight cement panel according to claim 12, further comprising a step for manufacturing a porous compact by filling, curing, and solidifying a mixture prepared by kneading cement, water, reinforcing fibers, and foam obtained by prefoaming a foaming agent in a hermetically sealed cement form block as a step for manufacturing the panel proper comprising the lightweight cement and a step for manufacturing the panel proper by slicing the porous compact.

17. The method for manufacturing lightweight cement panel according to claim 12, further comprising a step for integrally covering the outer circumferential end part of the surface protection layer, which integrally covers the surface of the panel proper, with the panel proper by the end part protection layer.

18. A method for manufacturing a lightweight cement panel, comprising steps of:
   disposing a panel proper comprising lightweight cement in a product form block with a film, sheet, or board which serves as a surface protection layer disposed on the inner surface of the hermetically-sealable product form block;
   filling a clearance between the inner surface of the surface protection layer and the surface of the panel proper with expandable synthetic resin so that the surface reinforcing sheet comprising woven cloth or unwoven cloth is disposed to be embedded;

integrally covering the surface of the panel proper with the surface resin layer with the surface reinforcing sheet embedded by closing the product form block under this condition and foaming and hardening the expandable synthetic resin; and simultaneously bonding film, sheet, or board which serves as the surface protection layer to the panel proper by the surface foam layer.

19. A method for manufacturing a lightweight cement panel, comprising steps of manufacturing a porous compact by filling, curing, and solidifying a mixture prepared by kneading cement, water, reinforcing fibers, and foam obtained by prefoaming a foaming agent in a hermetically sealed cement form block;

filling expandable synthetic resin between the outer-circumferential side surface of the porous compact and a foam-molding form block to foam and harden in the hermetically sealed foam-molding form block, and integrally covering the outer-circumferential side surface of the porous compact by the expandable synthetic resin layer;

slicing the porous compact covered by the expandable synthetic resin layer and fabricating a panel proper of a predetermined thickness with the side end face covered by a side foam layer comprising the expandable synthetic resin; and integrally covering the surface of the panel proper with a surface reinforcing sheet.

20. The method for manufacturing a lightweight cement panel according to claim 19, wherein the surface of the surface reinforcing sheet is integrally covered by the surface protection layer in the process to integrally cover the surface of the panel proper with the surface reinforcing sheet.

21. The method for manufacturing a lightweight cement panel according to claim 20, wherein in the step for covering the panel proper with the surface protection layer, with film, sheet or board which serves as the surface protection layer disposed on the inner surface of the hermetically sealed cement form block, the panel proper comprising the lightweight cement is disposed in the product form block and at the same time, expandable synthetic resin is filled between the inner surface of the surface protection layer and the surface of the panel proper so that the surface reinforcing sheet comprising woven cloth or unwoven cloth is disposed to be embedded, and the surface of the panel proper is integrally covered by the surface resin layer with the surface reinforcing sheet embedded by foam-curing the expandable synthetic resin by closing the product form block under this condition, and at the same time, film, sheet or board which serves as the surface protection layer is bonded to the panel proper by the surface resin layer.

22. A method for manufacturing a lightweight cement panel, comprising steps of:

manufacturing a porous compact by filling, curing, and solidifying a mixture prepared by kneading cement, water, reinforcing fibers, and foam obtained by prefoaming a foaming agent in a hermetically sealed cement form block;

temporarily fixing a reinforcing sheet comprising woven cloth or unwoven cloth to the outer-circumferential side of the porous compact;

filling a clearance between the outer-circumferential side surface of the porous compact to which the reinforcing sheet is temporarily fixed and a foam-forming form block in the hermetically sealed foam-forming form block to allow it to foam and solidify;

integrally covering the reinforcing sheet and expandable synthetic resin layer on the outer circumferential side surface of the porous compact;

fabricating a panel proper of a predetermined thickness with the side end face covered with a side face reinforcing sheet comprising the reinforcing sheet and a side part foam layer comprising the expandable synthetic resin by slicing the porous compact with the reinforcing sheet and expandable synthetic resin layer, and integrally covering the surface of the panel proper by a surface reinforcing sheet.

\* \* \* \* \*